US012347449B2

(12) United States Patent
Mosayyebpour Kaskari et al.

(10) Patent No.: US 12,347,449 B2
(45) Date of Patent: Jul. 1, 2025

(54) SPATIO-TEMPORAL BEAMFORMER

(71) Applicant: Synaptics Incorporated, San Jose, CA (US)

(72) Inventors: Saeed Mosayyebpour Kaskari, Irvine, CA (US); Alireza Masnadi-Shirazi, Irvine, CA (US)

(73) Assignee: Synaptics Incorporated, San Jose, CA (US)

( * ) Notice: Subject to any disclaimer, the term of this patent is extended or adjusted under 35 U.S.C. 154(b) by 242 days.

(21) Appl. No.: 18/160,296

(22) Filed: Jan. 26, 2023

(65) Prior Publication Data

US 2024/0257822 A1 Aug. 1, 2024

(51) Int. Cl.
*G10L 21/0232* (2013.01)
*G10L 21/0216* (2013.01)
*H04R 3/00* (2006.01)

(52) U.S. Cl.
CPC .......... *G10L 21/0232* (2013.01); *H04R 3/005* (2013.01); *G10L 2021/02166* (2013.01)

(58) Field of Classification Search
CPC . G10L 21/0232; G10L 21/0208; G10L 25/30; G10L 15/16; G10L 2021/02166; H04R 1/406; H04R 1/08; H04R 3/005; H04R 3/00; H04R 25/405; H04R 25/507; H04R 5/027; H04R 2430/03; H04R 2430/20
See application file for complete search history.

(56) References Cited

U.S. PATENT DOCUMENTS

2008/0240463 A1* 10/2008 Florencio ............... H04R 3/005 381/92
2008/0247274 A1* 10/2008 Seltzer .................. G01S 3/8083 702/194

(Continued)

OTHER PUBLICATIONS

Souden et al., "A study of the LCMV and MVDR Noise Reductionfilters," IEEE Trans. Signal Process., vol. 58, No. 9, pp. 4925-4935, Sep. 2010.

(Continued)

*Primary Examiner* — Yogeshkumar Patel
(74) *Attorney, Agent, or Firm* — Paradice & Li LLP

(57) ABSTRACT

This disclosure provides methods, devices, and systems for signal processing. The present implementations relate more specifically to a spatio-temporal beamformer. In some aspects, a beamforming system may receive an audio signal via a plurality of microphones, the audio signal including a number (B) of frames for each of the plurality of microphones, each of the B frames for each of the plurality of microphones including a number (N) of time-domain samples. For a first microphone, the beamforming system may transform the B*N time-domain samples into B*N/2 first frequency-domain samples; transform the B*N/2 first frequency-domain samples into B*N/2 second frequency-domain samples; and determine a probability of speech associated with the B*N/2 second frequency-domain samples based on a neural network model. The beamformer system may determine a minimum variance distortionless response (MVDR) beamforming filter based at least in part on the probability of speech for the first microphone.

20 Claims, 8 Drawing Sheets

(56) References Cited

U.S. PATENT DOCUMENTS

| | | | | |
|---|---|---|---|---|
| 2022/0148611 | A1* | 5/2022 | Slapak | G10L 15/22 |
| 2022/0240026 | A1* | 7/2022 | Zahedi | H04R 25/405 |

OTHER PUBLICATIONS

Tashev et al., "Unified Framework for Single Channel Speech Enhancement," IEEE Pacific Rim Conference on Communications, Computers and Signal Processing, 6 pages, Aug. 2009.

Hsu et al. "Robust Voice Activity Detection Algorithm Based on Feature of Frequency Modulation of Harmonics and its DSP Implementation", IEICE Trans. Inf. & Syst., vol. E98-D, No. 10 Oct. 2015 (Year: 2015).

Park et al. "Voice Activity Detection in Noisy Environments Based on Double-Combined Fourier Transform and Line Fitting", Sci. World Journal, 2014 (Year: 2014).

Raychowdhury et al. "A 2.3 nJ/Frame Voice Activity Detector-Based Audio Front-End for Context-Aware System-On-Chip Applications in 32-nm CMOS", IEEE Journal of Solid-State Circuits vol. 48, No. 8, Aug. 2013 (Year: 2013).

* cited by examiner

SPATIO-TEMPORAL BEAMFORMER

TECHNICAL FIELD

The present implementations relate generally to signal processing, and specifically to a spatio-temporal beamformer for signal processing.

BACKGROUND OF RELATED ART

Beamforming is a signal processing technique that can focus the energy of signals transmitted or received in a spatial direction. For example, a beamformer can improve the quality of speech detected by a microphone array through signal combining at the microphone outputs. More specifically, the beamformer may apply a respective weight to the audio signal output by each microphone of the microphone array so that the signal strength is enhanced in the direction of the speech (or suppressed in the direction of noise) when the audio signals are combined. Example beamforming techniques include, among other examples, minimum variance distortionless response (MVDR) beamforming.

Some beamforming techniques rely on voice activity detection to determine the direction of speech. Some voice activity detectors (VADs) implement machine learning, such as deep neural networks. Such techniques for determining a probability of speech typically use signals in a high frequency resolution to achieve more accurate detection of speech activity. As such, machine learning techniques may use significant computing resources, such as memory and processing power. However, many edge devices that may make use of beamforming and voice activity detection techniques (e.g., headset devices for voice calls) typically have computing resource constraints. Thus, there is a need to reduce the computing resource expense of voice activity detection techniques.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter of this disclosure can be implemented in a method of processing an audio signal. The method includes receiving a first audio signal via a plurality of microphones, the first audio signal including a number (B) of frames for each of the plurality of microphones, each of the B frames for each of the plurality of microphones including a number (N) of time-domain samples. The method also includes, for a first microphone included in the plurality of microphones, transforming the B*N time-domain samples into B*N/2 first frequency-domain samples based on an N-point fast Fourier transform (FFT); transforming the B*N/2 first frequency-domain samples into B*N/2 second frequency-domain samples based on a B-point FFT; and determining a probability of speech associated with the B*N/2 second frequency-domain samples based on a neural network model. The method further includes determining a minimum variance distortionless response (MVDR) beamforming filter based at least in part on the probability of speech for the first microphone; and processing the first audio signal based on the MVDR beamforming filter.

Another innovative aspect of the subject matter of this disclosure can be implemented in a beamforming system, including a processing system and a memory. The memory stores instructions that, when executed by the processing system, cause the beamforming system to receive a first audio signal via a plurality of microphones, the first audio signal including a number (B) of frames for each of the plurality of microphones, each of the B frames for each of the plurality of microphones including a number (N) of time-domain samples; for a first microphone included in the plurality of microphones: transform the B*N time-domain samples into B*N/2 first frequency-domain samples based on an N-point fast Fourier transform (FFT), transform the B*N/2 first frequency-domain samples into B*N/2 second frequency-domain samples based on a B-point FFT, and determine a probability of speech associated with the B*N/2 second frequency-domain samples based on a neural network model; determine a minimum variance distortionless response (MVDR) beamforming filter based at least in part on the probability of speech for the first microphone; and process the first audio signal based on the MVDR beamforming filter.

BRIEF DESCRIPTION OF THE DRAWINGS

The present implementations are illustrated by way of example and are not intended to be limited by the figures of the accompanying drawings.

DETAILED DESCRIPTION

Figure 1:
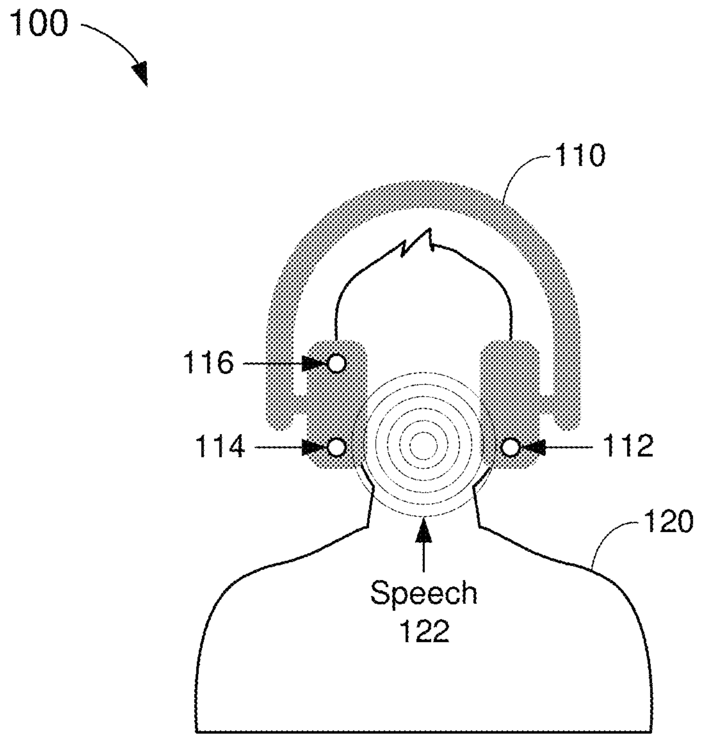
FIG. 1 shows an example environment for which beamforming may be implemented.

In the following description, numerous specific details are set forth such as examples of specific components, circuits, and processes to provide a thorough understanding of the present disclosure. The term "coupled" as used herein means connected directly to or connected through one or more intervening components or circuits. The terms "electronic system" and "electronic device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory.

These descriptions and representations are the means used by those skilled in the data processing arts to most effectively convey the substance of their work to others skilled in the art. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example input devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium including instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors (or a processing system). The term "processor," as used herein may refer to any general-purpose processor, special-purpose processor, conventional processor, controller, microcontroller, and/or state machine capable of executing scripts or instructions of one or more software programs stored in memory.

As described above, a beamformer can improve the quality of speech detected by a microphone array through signal combining at the microphone outputs. For example, the beamformer may apply a respective weight to the audio signal output by each microphone of the microphone array so that the signal strength is enhanced in the direction of the speech (or suppressed in the direction of noise) when the audio signals are combined. Example beamforming techniques include, among other examples, minimum variance distortionless response (MVDR) beamforming.

An MVDR beamformer determines a set of weights (also referred to as an MVDR beamforming filter) that reduces or minimizes the noise component of received audio signals without distorting the speech component. More specifically, the MVDR beamforming filter coefficients can be determined as a function of the covariance of the noise component of the received audio signal and a set of relative transfer functions (RTFs) between the microphones of the microphone array (also referred to as an "RTF vector").

Beamforming techniques may use voice activity detection to determine a direction of speech. Machine learning-based techniques, such as deep neural networks, can be used in voice activity detection to determine a probability and direction of speech in audio signals. Machine learning-based techniques tend to produce more accurate voice activity detection results for input signals having higher frequency resolutions than for input signals having lower frequency resolutions. As such, machine learning-based voice activity detection techniques may use significant computing resources, such as memory and/or processing power to achieve accurate voice activity detection. However, many devices that implement beamforming techniques have computing resource constraints. Aspects of the present disclosure recognize that multiple frames of an audio signal sampled at a relatively low frequency resolution can be combined to generate a signal that simulates a signal sampled at an uneven frequency resolution, including a relatively high frequency resolution at certain frequency bins, suitable for use in a beamforming filter while meeting computing resource constraints. As used herein, "computing resource" may generally represent any hardware and/or software systems, applications, and/or components that may be used for the operation of a computing device and/or the performance of a functionality thereof. Examples of computing resources include, without limitation, memory, storage, processor capacity (e.g., processor cores, processor bandwidth), electrical power (e.g., battery power), and/or the like.

Various aspects relate generally to signal processing, and more particularly, to spatio-temporal beamforming techniques for processing audio signals. In some aspects, a signal processing system may include a beamformer and a neural network (NN). The NN is configured to receive an input audio signal and determine a probability of speech associated with the input audio signal based on a neural network model. A subband analysis module may transform the input audio signal from the time domain to the frequency domain at a relatively low frequency resolution associated with a coarse frequency domain. A transform module may further transform the transformed input audio signal to a relatively high frequency resolution associated with a fine frequency domain for input to the NN. The NN determines a probability of speech in the fine frequency domain based on the further transformed frequency domain signal. A mixer module may generate a speech signal based on the probability of speech and the further-transformed input audio signal at the second frequency resolution. One or more transform modules may map each of the speech signal and the input audio signal to a respective signal having an uneven frequency resolution across frequency bands. A beamforming module may determine a beamforming filter based on the speech signal and the input audio signal with the uneven frequency resolution.

Particular implementations of the subject matter described in this disclosure can be implemented to realize one or more of the following potential advantages. The spatio-temporal beamformer can reduce noise and minimize distortion of speech in audio signals while meeting constraints for lower computing resource consumption. More specifically, computing resource consumption can be controlled by sampling a signal at a certain rate associated with the coarse frequency domain and transforming that signal to a signal associated with a certain rate in the fine frequency domain. Further, that signal is then further transformed to a signal that has an uneven frequency resolution by frequency band, and a beamforming filter is determined based on the signal with the uneven frequency resolution. As such, a beamforming filter with an uneven frequency resolution, by processing the signal at a relatively high frequency resolution for at least some frequency bands and at a relatively low frequency resolution for other frequency bands, can accurately enhance speech in audio signals while meeting constraints for lower computing resource consumption.

FIG. 1 shows an example environment 100 for which beamforming may be implemented. The example environment 100 includes a headset 110 and a user 120. In some aspects, the headset 110 may include a number of microphones 112-116 (also referred to as a "microphone array"). In the example of FIG. 1, the headset 110 is shown to include three microphones 112-116. However, in some other implementations, the headset 110 may include fewer or more microphones than those depicted in FIG. 1.

The microphones 112-116 are positioned or otherwise configured to detect speech 122 (depicted as a series of acoustic waves) propagating from the mouth of the user 120 (e.g., from other persons in the surrounding environment). For example, each of the microphones 112-116 may convert the detected speech 122 to an electrical signal (also referred to as an "audio signal") representative of the acoustic waveform. Each audio signal may include a speech component (representing the user speech 122) and a noise component (representing noise from the headset 110 or the surrounding environment). Due to the spatial positioning of the microphones 112-116, the speech 122 detected by some of the microphones in the microphone array may be delayed relative to the speech 122 detected by some other microphones in the microphone array. In other words, the microphones 112-116 may produce audio signals with varying phase offsets.

In some aspects, the audio signals produced by each of the microphones 112-116 may be weighted and combined to enhance the speech component or suppress the noise component. More specifically, the weights applied to the audio signals may be configured to improve the signal strength in a direction of the speech 122. Such signal processing techniques are referred to as "beamforming." In some implementations, a beamformer may estimate (or predict) a set of weights to be applied to the audio signals (also referred to as a "beamforming filter") that enhances the signal strength in the direction of speech. The quality of speech in the resulting signal depends on the accuracy of the beamforming filter coefficients. For example, the speech may be enhanced when the beamforming filter is aligned with a direction of the user's mouth. On the other hand, the speech may be distorted or suppressed if the beamforming filter is aligned with a direction of a noise source.

Beamformers can dynamically adjust the beamforming filter coefficients to optimize the quality, or the signal-to-noise ratio (SNR), of the combined audio signal. Example beamforming techniques include, among other examples, minimum variance distortionless response (MVDR) beamforming. An MVDR beamformer determines a beamforming filter that reduces or minimizes the noise component of the audio signals without distorting the speech component.

In some implementations, a beamformer may implement machine learning to determine (e.g., infer) a probability of speech in audio signals. Based on the determined probability of speech associated with different directions, a beamformer may determine a beamforming filter that can minimize noise at a desired direction without distorting speech. Machine learning, which generally includes a training phase and an inferencing phase, is a technique for improving the ability of a computer system or application to perform a certain task. Deep learning is a particular form of machine learning in which the inferencing (and training) phases are performed over multiple layers, producing a more abstract dataset in each successive layer. Deep learning architectures are often referred to as "artificial neural networks" due to the manner in which information is processed (similar to a biological nervous system).

The frequency resolution of the signals input to a neural network can affect the accuracy and precision of the inferencing result. More specifically, a neural network tends to produce more accurate inferencing results for input signals having higher frequency resolutions than for input signals having lower frequency resolutions. However, processing of higher frequency-resolution input signals may use significant computing resources (e.g., memory, processing power). Additionally, for far-field situations (e.g., the audio source is at a relatively far distance from the microphone array), the length of a room impulse response is long, and accordingly a beamforming filter with a high frequency resolution can more accurately filter for speech and/or noise across the length of the room impulse response of the audio signals. Aspects of the present disclosure recognize that frames of an audio signal sampled at an even frequency resolution can be mapped to an uneven frequency resolution, and that a beamforming filter with an uneven frequency resolution may be used to process that signal, so that the frames may be processed at higher frequency resolutions for certain frequency bands and processed at lower frequency resolutions for other frequency bands. As such, a device implementing the beamforming filter may accurately process audio signals to enhance speech while consuming less computing resources compared to conventional beamforming approaches. Further as such, a device implementing the beamforming filter may be optimized for far-field situations while consuming less computing resources compared to conventional beamforming approaches.

Figure 2:
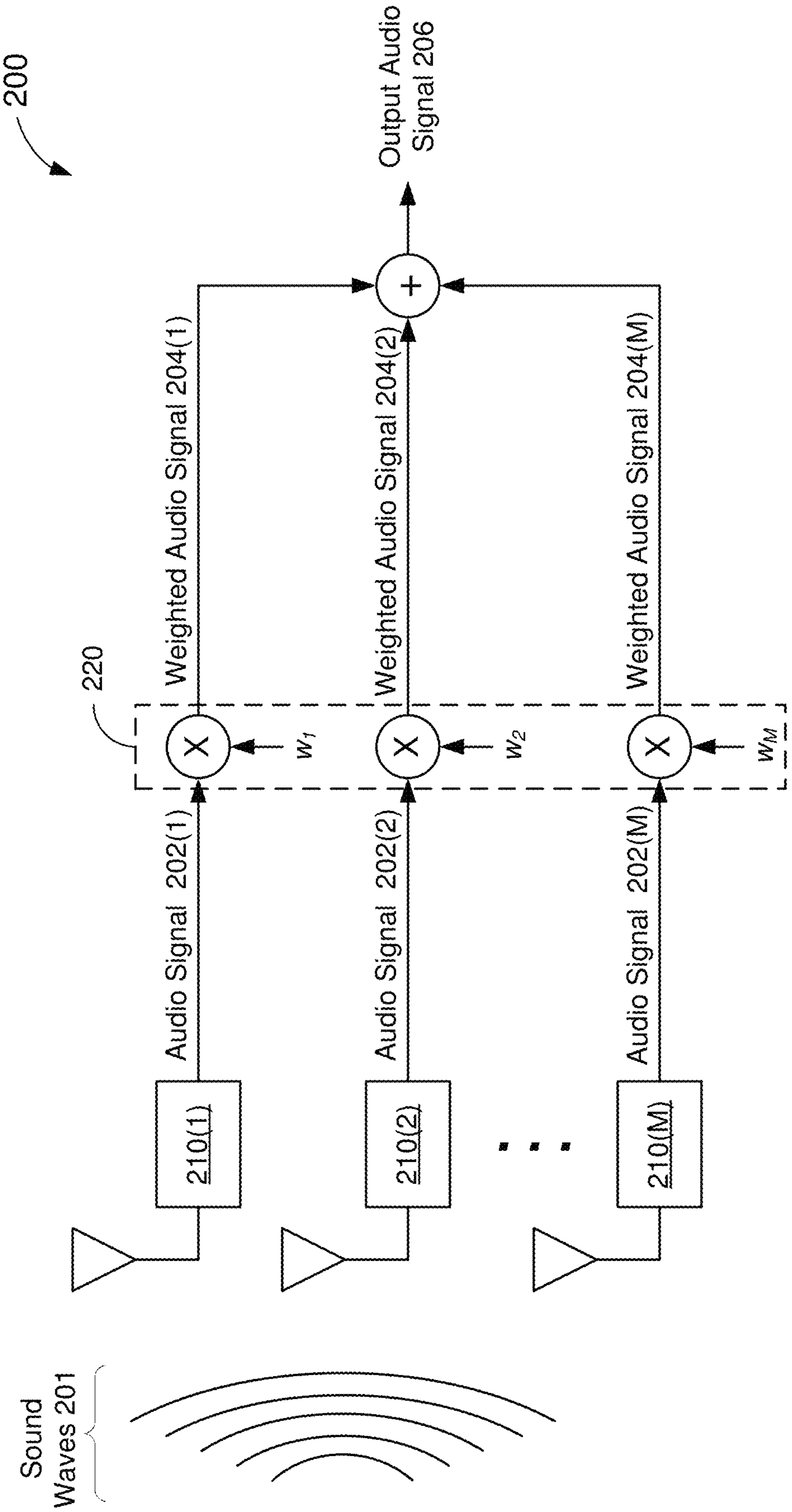
FIG. 2 shows an example audio receiver configurable for beamforming, according to some implementations.

FIG. 2 shows an example audio receiver 200 configurable for beamforming, according to some implementations. The audio receiver 200 includes a number (M) of microphones 210(1)-210(M), arranged in a microphone array, and a beamforming filter 220. In some implementations, the audio receiver 200 may be one example of the headset 110 of FIG. 1. With reference for example to FIG. 1, each of the microphones 210(1)-210(M) may be one example of any of the microphones 112-116.

The microphones 210(1)-210(M) are configured to convert a series of sound waves 201 (also referred to as "acoustic waves") into audio signals 202(1)-202(M), respectively. In some implementations, the sound waves 201 may include user speech (such as the speech 122 of FIG. 1) mixed with noise or interference (such as reverberant noise from a headset enclosure). Each of the microphones 210(1)-210(M) may continuously capture sound waves and convert those sound waves into audio signals. Accordingly, the audio signals for a given microphone 210 may include a signal captured at a certain point in time ("current"), a signal captured at a prior point in time ("past"), and a signal captured at a subsequent point in time ("future"). Accordingly, the audio signals 202(1)-202(M) can be modeled as a vector (X):

$$X(l,k)=\left[X_1^H(l,k),\,X_2^H(l,k),\,\ldots\,,X_M^H(l,k)\right]^T \tag{1}$$

$$X_i(l,k)=\left[X_i^{past}(l,k),\,X_i^{current}(l,k),\,X_i^{future}(l,k)\right]^T \tag{2}$$

$$X_i^{current}(l,k)=X_i(l,k) \tag{3}$$

$$X_i^{future}(l,k)=[X_i(l+1,k),\,\ldots\,,X_i(l+b_k,k)] \tag{4}$$

$$X_i^{past}(l,k)=[X_i(l-1,k),\,\ldots\,,X_i(l-a_k,k)] \tag{5}$$

$$Q_k=a_k+b_k \tag{6}$$

where l is a frame index representing one of a number (L) of audio frames, k is a frequency index representing one of a number (K) of frequency bands or bins, i is a microphone index representing one of a number (M) of microphones (e.g., $1\leq i\leq M$, where M is an example of the number M of microphones in FIG. 2), $Q_k$ is a length of the beamforming filter 220 for a given frequency index k, and $b_k$ is an amount of latency introduced by the beamforming filter 220.

The beamforming filter 220 applies a vector of weights $w=[w_1, \ldots, w_M]^T$ (where $w_1$ thru $w_M$ are referred to as filter coefficients and can themselves be vectors) to the audio signals 202(1)-202(M) to produce weighted audio signals 204(1)-204(M), respectively. The weighted audio signals 204(1)-204(M) are combined (such as by summation) to produce an output audio signal 206. Accordingly, the output audio signal 206 can be modeled as follows:

$$S(l,k)=w(l,k)X(l,k) \tag{7}$$

where w represents the beamforming filter (or vector) 220. In some aspects, a beamformer (not shown for simplicity) may determine a vector of weights w that optimizes the output audio signal 206 with respect to one or more conditions.

For example, an MVDR beamformer is configured to determine a vector of weights w that reduces or minimizes the variance of the noise component of the output audio signal 206 without distorting the speech component of the output audio signal 206. In other words, the vector of weights w may satisfy the following condition:

$$\text{argmin}_w w^H \phi_{nn} w \text{ s.t. } w^H a=1 \tag{8}$$

where $\phi_{nn}(l,k)\in C^{Q_kM\times Q_kM}$ is a covariance matrix of the noise component of the received audio signal X(l,k) at each time-frequency, and a is a steering vector or a relative transfer function (RTF) of the target speech component. The resulting vector of weights w is an MVDR beamforming filter ($w_{MVDR}(l,k)$), which can be expressed as:

$$w_{MVDR}(l,k)=[w_1(l,k),\,w_2(l,k),\,\ldots\,,w_M(l,k)]^T \tag{9}$$

$$w_i(l,k)=\left[w_i^1(l,k),\,w_i^2(l,k),\,\ldots\,,w_i^{Q_k}(l,k)\right]^T \tag{10}$$

Accordingly, Equation 7 above, when representing an output audio signal 206 produced by an MVDR beamforming filter, may be re-written as follows:

$$S_{MVDR}(l,k)=w_{MVDR}(l,k)X(l,k) \tag{11}$$

The above-described condition in Equation 8 that the vector of weights w may satisfy may be re-written as follows:

$$w_{MVDR}=\text{argmin}_w w^H \phi_{nn} w \text{ s.t. } w^H a=1$$

The solution to this condition may be described as follows:

$$w_{MVDR}(l,k)=\frac{W(l,k)}{W_{norm}^l(l,k)}u,\; W_{MVDR}(l,k)\in C^{Q_kM} \tag{12}$$

$$W(l,k)=\phi_{nn}^{-1}(l,k)\phi_{ss}^l(l,k) \tag{13}$$

where u is a vector representing a reference microphone channel, and $\phi_{ss}(l,k)\in C^{Q_kM\times Q_kM}$ is a covariance matrix of the target speech component of the received audio signal X(l,k) at each time-frequency. $W_{norm}{}^l(l,k)$ is a normalization factor that can be obtained using W(l,k). In some implementations, $W_{norm}(l,k)$ is determined as $W_{norm}(l,k)=\max(|W(l,k)|)$ or $W_{norm}(l,k)=\text{trace}(W(l,k))$. Further, in some implementations, $w_{MVDR}(l,k)$ can be estimated based on the following:

$$W(l,k)=\phi_{nn}^{-1}(l,k)\phi_{ss}(l,k)w_{MVDR}(l-1,k) \tag{14}$$

As illustrated by Equation 11, the amount of computing resources needed to determine the MVDR beamforming filter depends on the number of microphones M and the filter length $Q_k$ per frequency index k. To reduce expense of computing resources associated with determining the MVDR beamforming filter, a Fourier transform (e.g., a fast Fourier transform) of size $Q_k$ may be determined per frequency index k for an input audio signal $X_i(l,k)$ for a given microphone, resulting in a signal $X_i^{\sim}(l,k,q)$. The higher frequency-resolution signal $X_i^{\sim}(l,k,q)$ may be described as a signal in a "fine domain," and the lower frequency-resolution signal $X_i(l,k)$ may be described as a signal in a "coarse domain." Accordingly, Equations 11 and 13 may be updated as follows:

$$\tilde{w}_{MVDR}(l,k,q) = \frac{\tilde{W}(l,k,q)}{\tilde{W}^{l}_{norm}(l,k,q)}u,\ \tilde{w}_{MVDR}(l,k,q) \in C^M \tag{15}$$

$$\tilde{W}(l,k,q) = \phi_{nn}^{-1}(l,k,q)\phi_{ss}(l,k,q),\ \phi_{ss}(l,k,q),\ \phi_{nn}(l,k,q) \in C^{M\times M} \tag{16}$$

Equation (15) will estimate the beamformer filter $\tilde{w}_{MVDR}$ in the fine domain. The beamforming filter will be transformed to coarse domain as follows:

$$w_{MVDR}(l,k) = circshift\{IFFT(\tilde{w}_{MVDR}(l,k)),\ b_k\} \tag{18}$$

$$\tilde{w}_{MVDR}(l,k) = \left[\tilde{w}_{MVDR}(l,k,1),\ \ldots,\ \tilde{W}_{MVDR}(l,k,Q_k)\right] \tag{19}$$

where the IFFT is an inverse fast Fourier transform. The beamformer coefficients $w_{MVDR}(l,k)$ will set to zero for elements from $$b_k + \frac{Q_k}{2} + 1$$

to the end. The output audio signal $S_{MVDR}(l,k)$ is obtained as follows:

$$S_{MVDR}(l,k) = w_{MVDR}(l,k)X(l,k) \tag{20}$$

$$w_{MVDR}(l,k) = [w_1(l,k),\ \ldots,\ w_M(l,k)]^T \tag{21}$$

Where $w_i(l,k)$ are the vector of length $Q_k$.

The covariances of noise and speech may be estimated as follows:

$$X^{\sim}(l,k,q) = [X_1^{\sim}(l,k,q),\ X_2^{\sim}(l,k,q),\ \ldots,\ X_M^{\sim}(l,k,q)]^T,\quad q = 1,\ \ldots,\ Q_k \tag{22}$$

$$\phi_{nn}(l,k,q) = p^{NN}(l,k,q)\phi_{nn}(l-1,k,q) + \left(1 - p^{NN}(l,k,q)\right)\left(X^{\sim}(l,k,q)X^{\sim H}(l,k,q)\right) \tag{23}$$

$$\phi_{nn}(l,k,q) = \left(1 - p^{NN}(l,k,q)\right)\phi_{ss}(l-1,k,q) + p^{NN}(l,k,q)\left(X^{\sim}(l,k,q)X^{\sim H}(l,k,q)\right) \tag{24}$$

where $p^{NN}(l,k,q)$ is a probability of speech at each time-frequency in the fine domain, determined based on a neural network (e.g., a deep neural network (DNN)) trained to infer a probability of speech in audio signals. In some implementations, the probabilities of speech $p^{NN}(l,k,q)$ for the M microphones are assumed to be the same. Accordingly, $p_i^{NN}(l,k,q)$ may be determined for one microphone (e.g., i=1 for the first microphone amongst the M microphones), and that $p_i^{NN}(l,k,q)$ for the one microphone (e.g., $p_1^{NN}$) may be used for the other microphones (e.g. the other values of i). That is, $p^{NN}$ in Equations 23-24 may be $p_1^{NN}$. For ease of description and understanding, in the description below, that one microphone is assumed to be the first microphone (e.g., i=1) amongst the M microphones. More generally, any one of the M microphones may be used as the one microphone for which $p^{NN}$ is determined. Determination of $p^{NN}(l,k,q)$ is further described below.

Figure 3:
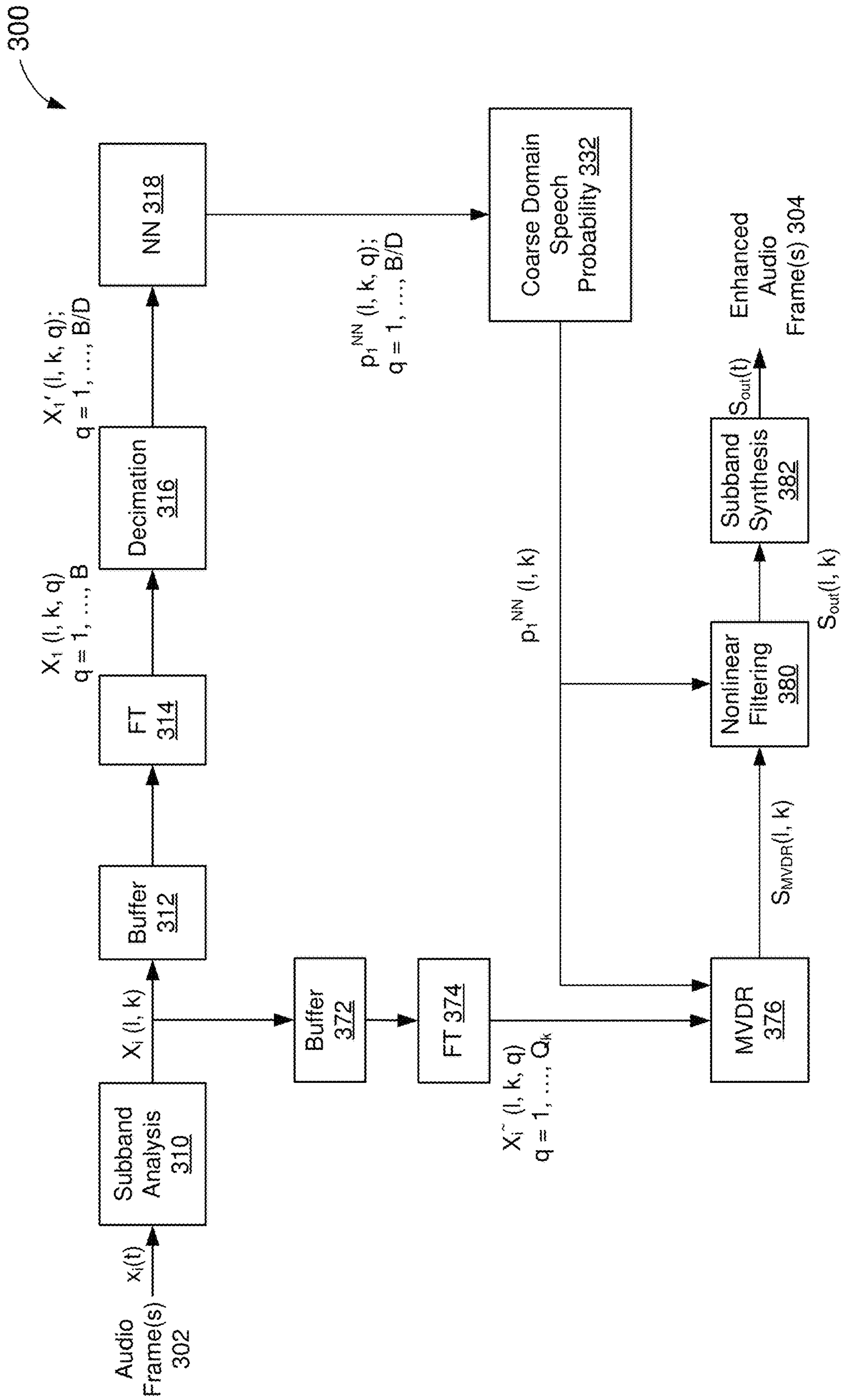
FIG. 3 shows a block diagram of an example beamforming system, according to some implementations.

FIG. 3 shows a block diagram of an example beamforming system 300. The beamforming system 300 is configured to generate one or more frames of an enhanced audio signal 304 based on one or more frames of an audio signal 302 received via a microphone array. In some implementations, the microphone array may include any of the microphones 112-116 of FIG. 1 or any of the microphones 210(1)-210(M) of FIG. 2. With reference for example to FIG. 2, the audio signal 302 may be one example of a set of audio signals $x_i(t)$, in a time domain, received via the microphones 210(1)-210 (M) (which includes the audio signals 202(1)-202(M), respectively). The MVDR beamforming filter implemented by the MVDR beamforming filter module 376 may be one example of the beamforming filter 220. Further, the output audio signal $S_{MVDR}(l,k)$ output by the MVDR beamforming filter module 376 may be one example of the output audio signal 206.

As shown, the beamforming system 300 includes a subband analysis module 310, a first buffer 312, a first Fourier transform (FT) 314, a decimation module 316, a neural network (NN) 318, a coarse domain speech probability module 332, a second buffer 372, a second FT 374, an MVDR beamforming filter module 376, a nonlinear filtering module 380, and a subband synthesis module 382. The subband analysis module 310 is configured to convert the input audio signal $x_i(t)$ from the time domain to the time-frequency domain. For example, the subband analysis module 310 may transform a number (N) of time-domain samples, representing a frame 302 of the input audio signal $x_i(t)$, to N frequency-domain samples representing a respective frame of an audio signal $X_i(l,k)$ in the time-frequency domain, where l is a frame index, k is a frequency band or bin (hereinafter "frequency bin") index, and i is a microphone index (e.g., 1≤i≤M). In some implementations, the subband analysis module 310 may perform the transformation from the time domain to the time-frequency domain using a Fourier transform, such as a fast Fourier transform (FFT).

In some implementations, the subband analysis module 310 may transform the audio frame 302 into a frame of a time-frequency domain signal $X_i(l,k)$ in the coarse domain, with N/2 frequency bins. That is, per frame l of the signal $X_i(l,k)$, k can have N/2 values (e.g., k=1, . . . , N/2). More generally, N represents an FFT size associated with the coarse domain (also referred to below as FFTsize_coarse), which corresponds to a window or frame size of a frame sampling period of the input audio signal $x_i(t)$; the FFT performed by the subband analysis module 310 is an N-point FFT. Further, the number of frequency domain samples per frame in the output of the N-point FFT is half of N, because half of the frequency spectrum in the output of the N-point FFT is redundant, and thus the signal $X_i(l,k)$ can have N/2 frequency bins per frame. For example, given a sampling rate of 16 kilohertz (KHz) for the input audio signal $x_i(t)$ and a window size of 8 milliseconds (ms), for the coarse domain, the FFTsize_coarse=N=128. Accordingly, the subband analysis module 310 may produce a time-frequency domain signal $X_i(l,k)$ with N/2=64 frequency bins per frame. In some implementations, the subband analysis module 310 may transform audio frames 302 at an overlap rate of 50%. That is, consecutive audio frames 302 transformed by the subband analysis module 310 overlap by 50%. At an overlap rate of 50%, the subband analysis module 310 may output a frame of the signal $X_i(l,k)$ at an interval that is half of the coarse domain window size (e.g., output a frame every 4 ms for a window size of 8 ms).

The first buffer 312 is configured to store (e.g., buffer) a number (B) of frames of the time-frequency domain signal $X_i(l,k)$ for one microphone (e.g., i=1 for the first microphone) amongst the M microphones. In some implementations, the size B of the first buffer 312 is set as follows:

$$B = V * \frac{\text{FFTsize\_fine}}{\text{FFTsize\_coarse}} \tag{25}$$

where FFTsize_coarse is the coarse domain FFT size as described above, the FFTsize_fine is a FFT size associated with the fine domain and the NN 318, and V is a factor that is set based on the rate of overlap at which the subband analysis module 310 transforms audio frames 302. The NN (e.g., a deep neural network (DNN)) 318 is trained on signals processed based on an FFT of size FFTsize_fine. For example, if the FFTsize_coarse is equal to 128, FFTsize_fine is equal to 512 (corresponding to a window size of 32 ms), and V=2, then the size B of the first buffer 312 is equal to 8. That is, the first buffer 312 can store 8 frames of the time-frequency domain signal $X_1(l,k)$ at a time. In some implementations, if the overlap rate is 50%, then V=2. In some other implementations, V may be another, greater value that is also a power of 2 (e.g., V=4 for an overlap rate of 75%). The examples described herein assume, unless otherwise indicated, that FFTsize_coarse is equal to 128, FFTsize_fine is equal to 512, and V=2 (corresponding to an overlap rate of 50%). In some implementations, FFTsize_coarse, FFTsize_fine, and V are respectively powers of 2. Accordingly, B is also a power of 2.

The FT 314 is configured to map frames of the time-frequency domain signal $X_1(l,k)$ (in the coarse domain) to corresponding frames of an audio signal $X_1(l,k,q)$ in the fine domain, where q is a sub-bin index indicating a number of sub-bins associated with a frequency bin (e.g., a given value of the frequency index k), by transforming multiple frames of $X_1(l,k)$ to corresponding frames of $X_1(l,k,q)$. In some implementations, the FT 314 is a Fourier transform (e.g., an FFT) of size B, and the number of sub-bins per frequency bin is equal to B (e.g., q=1, . . . , B). Accordingly, if B=8, then the FT 314 applies an 8-point FFT to the time-frequency domain signal $X_1(l,k)$ for each value of frequency bin index k, resulting in a signal $X_1(l,k,q)$, where q=1, . . . , 8 for each value of k. More generally, the FT 314 maps B frames of the time-frequency domain signal $X_1(l,k)$, obtained from the first buffer 312, to the signal $X_i(l,k,q)$ by applying a B-point FFT to the B frames of $X_1(l,k)$ per value of k. Notably, the number of frequency-domain samples (e.g., the number of sub-bins across the N/2 frequency bins) in $X_1(l,k,q)$ is B*N/2, which has the same value as FFTsize_fine. For example, if B is 8 and N/2 is 64, then B*N/2=512; the number of frequency-domain samples in $X_1(l,k,q)$ is the same number as if $x_1(t)$ is transformed to $X_1(l,k)$ using a 512-point FFT. Thus, multiple frames of the coarse domain signal $X_1(l,k)$ can be mapped to the fine domain, resulting in frame(s) of a signal $X_1(l,k,q)$ that simulates a fine domain signal suitable for the NN implemented by the NN 318.

The decimation module 316 is configured to perform signal decimation on the signal $X_1(l,k,q)$ by reducing the number of sub-bins per frequency bin in the signal $X_1(l,k,q)$ by a factor D, where D is a whole number of two or greater, resulting in a decimated signal $X_1'(l,k,q)$. That is, the number of per frequency bin, and correspondingly the number of frequency-domain samples in $X_1(l,k,q)$, is divided by D, so that the number of frequency-domain samples per frequency bin in the decimated signal $X_1'(l,k,q)$ is B/D (e.g., q=1, . . . , B/D). In some implementations, if the overlap rate at which the subband analysis module 310 transforms audio frames 302 is 50%, then D=2; the decimation module 316 halves the number of sub-bins per frequency bin, and thus the number of sub-bins per frequency bin is B/D=B/2 (e.g., q=1, . . . , B/2). For example, continuing with the above-described example in which k=1, . . . , 64 and B=8, decimation of the signal $X_1(l,k,q)$ by D=2 results in a decimated signal $X_1'(l,k,q)$ where q=1, . . . , 4 for each value of k. In some other implementations, D may be another power of 2 (e.g., D=4 if the overlap rate associated with the subband analysis module 310 is 75%). An example of signal decimation is described below with reference to FIG. 4.

The decimation module 316 may provide the decimated signal $X_1'(l,k,q)$ as an input to the NN 318. The NN 318 may determine (e.g., infer), based on the decimated signal $X_1'(l,k,q)$, a probability of speech $p_1^{NN}(l,k,q)$, where k=1, . . . , N/2 and q=1, . . . , B/D. As described above, in some implementations, the probability of speech for the multiple microphones may be assumed to be the same. Accordingly, $p_i^{NN}(l,k,q)$ may be determined for one microphone (e.g., i=1 for the first microphone amongst the M microphones), and that $p_1^{NN}(l,k,q)$ may be used for the other values of i. More specifically, the NN 318 is configured to receive an input signal for one microphone (e.g., $X_1'(l,k,q)$) and infer a probability of speech $p_1^{NN}(l,k,q)$ in the signal. In some implementations, the probability of speech $p_1^{NN}(l,k,q)$ is a vector of probability values for each sub-bin, per frequency bin, where each probability value can be between 0 to 1, inclusive. In some implementations, the NN 318 may be trained on audio signals processed at a certain overlap rate (the NN processes frames of signals at the overlap rate), and the decimation module 316 may provide the decimated signal $X_1'(l,k,q)$ to the NN 318 at a frame hop based on that overlap rate and the window size associated with the NN. For example, if the NN processes signals at an overlap rate of 50% and the window size associated with the NN is 32 ms, then the frame hop is 16 ms (50% of 32 ms). At a frame hop of 16 ms for the NN 318, and where the subband analysis module 310 operates with an 8 ms window size and a 50% overlap (thus outputting a frame every 4 ms), the NN 318 may process frames of the decimated signal $X_1'(l,k,q)$ to output a probability of speech $p_1^{NN}(l,k,q)$) at a rate of every 4 frames of $X_1(l,k)$. By operating at a reduced rate relative to the subband analysis module 310, the NN 318 consumes less computational resources power than if the NN 318 operates at the same rate as the subband analysis module 318.

The coarse domain speech probability module 332 is configured to map the probability of speech $p_1^{NN}(l,k,q)$ in the fine domain to the coarse domain. In some implementations, the coarse domain speech probability module 332 may map the probability of speech $p_1^{NN}(l,k,q)$ to a probability of speech $p_1^{NN}(l,k)$ in the coarse domain by calculating an average (e.g., mean) of the probability values of the sub-bins per frequency bin as follows:

$$p_1^{NN}(l,k) = \frac{1}{B/D}\sum_{q=1}^{B/D} p_1^{NN}(l,k,q) \tag{26}$$

The second buffer 372 is configured to store (e.g., buffer) a number of frames of the audio signal $X_i(l,k)$. For each microphone i, for each frequency bin k, the second buffer 372 may store a respective number ($Q_k$) of frames of the signal $X_i(l,k)$. $Q_k$ may be defined per frequency bin k based on a predetermined lookup table, a formula where $Q_k$ is a function of k, or various other predetermined rules. For example, $Q_k$ may be set to a particular value for values of k corresponding to frequencies below a predefined frequency threshold and may be set to a different value for other values of k. In some implementations, $Q_k$ may be larger for lower values of k (e.g., frequency bins corresponding to lower frequencies or frequencies below a threshold) and may be smaller for higher values of k (e.g., frequency bins corresponding to higher frequencies or frequencies above a threshold).

The second FT 374 is configured to map, for each microphone i, frames of the audio signal $X_i(l,k)$ to corresponding frames of an audio signal $X_i^{\sim}(l,k,q)$ with uneven frequency resolution. The second FT 374 may perform the mapping using a respective Fourier transform (e.g., an FFT) of size $Q_k$ for each frequency bin k, resulting in $Q_k$ sub-bins (e.g., q=1, . . . $Q_k$) per frequency bin k. For example, if $Q_1=8$ for a frequency bin k=1, then the second FT module 374 applies an FFT of size 8 to the signal $X_i(l,1)$, resulting in a signal $X_i^{\sim}(l,1,q)$, where q=1, 2, . . . , 8. If $Q_{33}=4$ for a frequency bin k=33, then the second FT 374 applies an FFT of size 4 to the signal $X_i(l,33)$, resulting in a signal $X_i^{\sim}(l,33,q)$, where q=1, 2, . . . , 4. In some implementations, $Q_k$ may be any whole number value between 1 and B, inclusive ($1 \le Q_k \le B$).

The MVDR beamforming filter module 376 receives the probability of speech $p_1^{NN}(l,k)$ and the time-frequency domain signal $X_i^{\sim}(l,k,q)$, from the coarse domain speech probability module 332 and the second FT 374, respectively. In some implementations, the MVDR beamforming filter module 376 may determine an MVDR beamforming filter $\tilde{w}_{MVDR}(l,k,q)$ based on $p_1^{NN}(l,k)$ and $X_i^{\sim}(l,k,q)$. The MVDR beamforming filter module 376 may further produce an output audio signal $S_{MVDR}(l,k)$ in the coarse domain based on $\tilde{w}_{MVDR}(l,k,q)$ and Equations 18-21 above. $\tilde{w}_{MVDR}(l,k,q)$ may be determined based on Equations 15-16 above and updates to Equations 22-24 as follows:

$$X^{\sim}(l,k,q) = [X_1^{\sim}(l,k,q), X_2^{\sim}(l,k,q), \dots, X_M^{\sim}(l,k,q)]^T, \quad q = 1, \dots, Q_k \tag{27}$$

$$\phi_{nn}(l,k,q) = p^{NN}(l,k)\phi_{nn}(l-1,k,q) + (1-p^{NN}(l,k))(X^{\sim}(l,k,q)X^{\sim H}(l,k,q)) \tag{28}$$

$$\phi_{ss}(l,k,q) = (1-p^{NN}(l,k))\phi_{ss}(l-1,k,q) + p^{NN}(l,k)(X^{\sim}(l,k,q)X^{\sim H}(l,k,q)) \tag{29}$$

where, for given values of k and i, the probability of speech $p_1^{NN}(l,k)$ is the same across the values of q.

In some implementations, $Q_k$ may be set to a value of 1 across all values of k. When $Q_k=1$ across all values of k, $X_i^{\sim}(l,k,q)$ input into MVDR beamforming filter module 376 is the same as $X_i(l,k)$ from the subband analysis module 310. Accordingly, in such implementations, the second buffer 372 and the second FT 374 may be omitted from the beamforming system 300.

The nonlinear filtering module 380 may estimate a power spectral density of noise $P_n(l,k)$ based on the output audio signal $S_{MVDR}(l,k)$ and the probability of speech $p^{NN}(l,k)$, as follows:

$$P_n(l,k) = p_1^{NN}(l,k)P_n(l,k) + (1-p_1^{NN}(l,k))|S_{MyDR}(l,k)|^2 \tag{30}$$

The nonlinear filtering module 380 may use the power spectral density of noise $P_n(l,k)$ to further reduce noise in the output audio signal $S_{MVDR}(l,k)$. For example, the nonlinear filtering module 380 may subtract the power spectral density of noise $P_n(l,k)$ from the output audio signal $S_{MVDR}(l,k)$ using a spectral subtraction technique. An example suitable nonlinear filter may include, among other examples, a Gaussian mixture model (GMM) with spectral subtraction. The nonlinear filter module 380 outputs an enhanced audio signal in the time-frequency domain $S_{out}(l,k)$ as a result of the spectral subtraction.

The subband synthesis module 382 is configured to transform the enhanced audio signal $S_{out}(l,k)$ from the frequency domain to the time domain, as an enhanced audio signal $S_{out}(t)$. In some implementations, the subband synthesis module 382 may reverse the transformation performed by the subband analysis module 310. For example, the subband synthesis module 382 may perform the transformation from the frequency domain to the time domain using an N-point inverse Fourier transform, such as an inverse FFT.

In some implementations, the beamforming system 300 can be configured to satisfy target computing resource consumption constraints of a device implementing the beamforming system 300 by adjusting FFTsize_coarse and/or FFTsize_fine. For example, power consumption may be reduced by increasing the value of FFTsize_fine. In an example, when the fine domain FFT size FFTsize_fine is equal to 512 (corresponding to a window size of 32 ms), the power consumption associated with the beamforming system 300 may be approximately double the power consumption of the beamforming system 300 when the fine domain FFT size FFTsize_fine is equal to 1024 (corresponding to a window size of 64 ms), with other things being equal, based on the assumption that the NN 318 with a larger input (e.g., an input with higher frequency resolution) will have similar computation under either values of FFTsize_fine. Similarly, FFTsize_coarse may be modified as well. More generally, the beamforming system 300 may be configured to satisfy target computing resource constraints, in exchange for the accuracy of the beamforming filter, by adjusting FFTsize_coarse and/or FFTsize_fine.

As described above, the signal $X_1(l,k,q)$ can be decimated by the decimation module 316 to a decimated signal $X_1'(l,k,q)$, in order to reduce redundancy in the signal before the signal is input into the NN 318. In some implementations, a scheme for signal decimation includes, for even frequency bins (e.g., even values of k), selecting a number (B/D) of sub-bins from the two ends of the range of values of the sub-bin index q (e.g., the first B/2D sub-bins and the last B/2D sub-bins) in the decimated signal $X_1'(l,k,q)$. For odd frequency bins (e.g., odd values of k), a number (B/D) of sub-bins from a middle portion of the range of values of the sub-bin index q are selected in the decimated signal $X_1'(l,k,q)$. The sub-bins that are not selected, and accordingly their corresponding frequency-domain samples, are discarded. The selected sub-bins, and accordingly their corresponding frequency-domain samples, are retained in the decimated signal $X_1'(l,k,q)$. Thus, in an example where B=8 and D=2, for even frequency bins (e.g., even values of k), the first two and the last two sub-bins (e.g., q=1, 2, 7, 8) are selected for retention in the decimated signal $X_1'(l,k,q)$. For odd frequency bins (e.g., odd values of k), the middle four sub-bins (e.g., q=3, 4, 5, 6) are selected for retention in the decimated signal $X_1'(l,k,q)$. The sub-bins that are not selected for retention in the decimated signal $X_1'(l,k,q)$ are discarded. In another example, where B=16 and D=2, for even frequency bins (e.g., even values of k), the first four and the last four sub-bins (e.g., q=1, 2, 3, 4, 13, 14, 15, 16) are selected for retention in the decimated signal $X_1'(l,k,q)$. For odd frequency bins (e.g., odd values of k), the middle eight sub-bins (e.g., q=5, 6, 7, 8, 9, 10, 11, 12) are selected for retention in the decimated signal $X_1'(l,k,q)$. The sub-bins that are not selected for retention in the decimated signal $X_1'(l,k,q)$ are discarded.

In some implementations, the decimation module 316 may re-arrange sub-bins that are selected for retention in the decimated signal $X_1'(l,k,q)$, in order to maintain a proper ordering of the frequencies corresponding to the sub-bins. Continuing with the decimation example above where B=8 and D=2, for the even frequency bins, the selected first two and last two sub-bins may be re-arranged so that the last-two sub-bins are placed before the first-two sub-bins in the decimated signal $X_1'(l,k,q)$ (e.g., sub-bins 7, 8 are moved to come before the sub-bins 1, 2), and the sub-bins selected for the odd frequency bins are not re-arranged.

Figure 4:
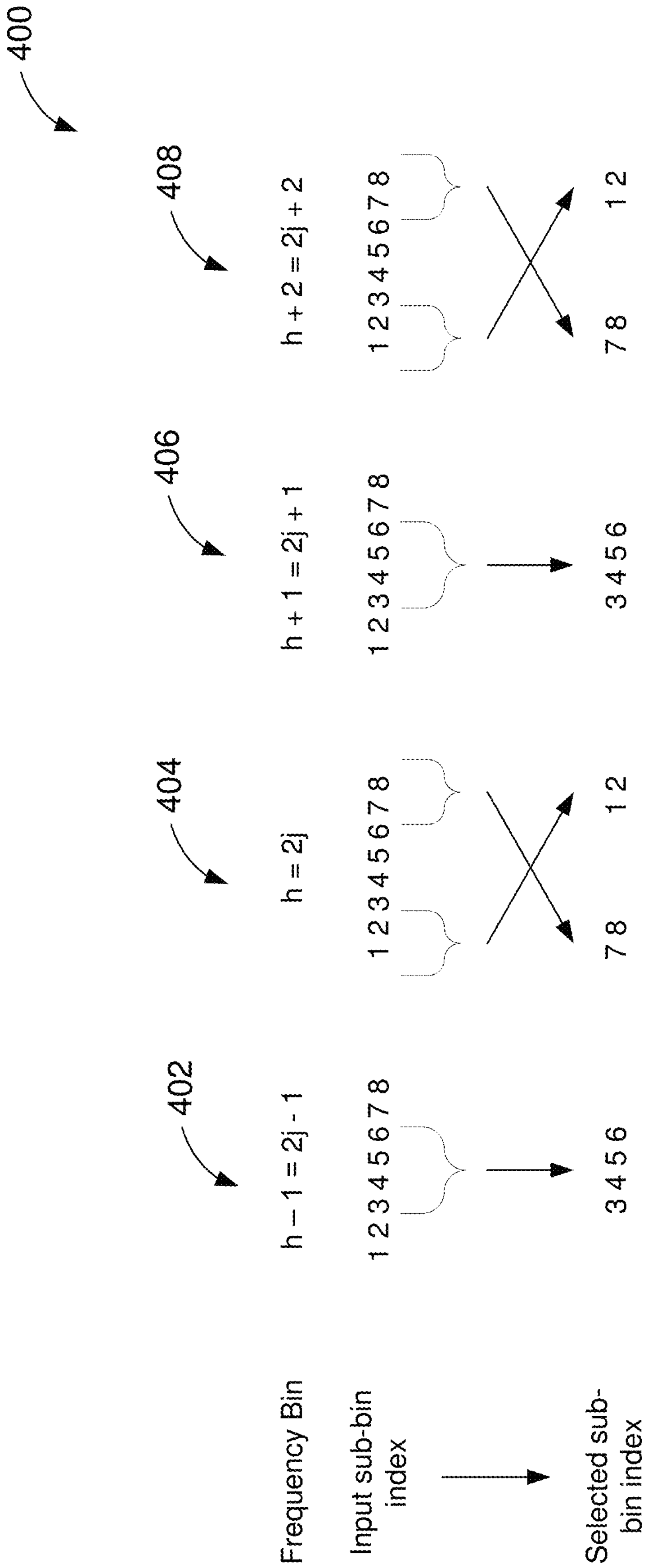
FIG. 4 shows an example operation for decimating a fine domain audio signal, according to some implementations.

FIG. 4 shows an example operation 400 for decimating a fine domain audio signal, according to some implementations. The operation 400 shows frequency bins 402, 404, 406, and 408 with frequency bin index values h−1, h, h+1, and h+2, respectively. Further as shown, FIG. 4 assumes values of B=8 and D=2. Frequency bins 402 and 406 are odd-numbered bins. As shown in FIG. 4, index value h−1 for frequency bin 402 is equal to an odd value 2j−1, and index value h+1 for frequency bin 406 is equal to an odd value 2j+1. On the other hand, frequency bins 404 and 408 are even-numbered bins. As shown in FIG. 4, index value h for frequency bin 404 is equal to an even value 2j, and index value h+2 for frequency bin 408 is equal to an even value 2j+2. In the example operation 400, for odd-numbered bins 402 and 406, sub-bins 3, 4, 5, 6 are selected for retention in the decimated signal $X_1'(l,k,q)$ without re-arrangement; sub-bins 3, 4, 5, 6 maintain their original order in the decimated signal. For even-numbered bins 404 and 408, sub-bins 1, 2 and 7, 8 are selected for retention in the decimated signal $X_1'(l,k,q)$ and re-arranged (e.g., swapped places) so that sub-bins 7, 8 occur before sub-bins 1, 2 in the decimated signal. The sub-bins that are not selected are discarded. Accordingly, the signal $X_1(l,k,q)$, where q=1, . . . , 8, is decimated by half to the decimated signal $X_1'(l,k,q)$, where q=1, . . . , 4.

In some other implementations, for even frequency bins (e.g., even values of f), the middle B/D sub-bins (e.g., q=3, 4, 5, 6 when B=8 and D=2) are selected and not re-arranged, and for odd frequency bins, the first B/2D and the last B/2D sub-bins (e.g., q=1, 2, 7, 8 when B=8 and D=2) are selected and re-arranged. In some other implementations, a scheme for signal decimation includes, for even frequency bins, selecting a number (B/D) of sub-bins from one end of the range of values of the sub-bin index q (e.g., the first B/D sub-bins) for retention in the decimated signal $X_1'(l,k,q)$. For odd frequency bins, a number (B/D) of sub-bins from the opposite end of the range of values of the sub-bin index q (e.g., the last B/D sub-bins) are selected for retention in the decimated signal $X_1'(l,k,q)$. Still further, in some implementations, none of the selected sub-bins are re-arranged. For example, for even frequency bins (e.g., even values of k), the first B/D sub-bins (e.g., q=1, 2, 3, 4 when B=8 and D=2) may be selected without re-arrangement, and for odd frequency bins, the last B/D sub-bins (e.g., q=5, 6, 7, 8 when B=8 and D=2) may be selected without re-arrangement.

As described above, for far-field situations, a beamforming filter with a higher frequency resolution is desirable and may improve the accuracy of the beamforming filter. To increase the frequency resolution of the beamforming filter while still respecting computing resource constraints, a beamforming filter with an uneven frequency resolution may be determined. As such, the beamforming filter may have a relatively high frequency resolution at certain frequency bands (e.g., low frequencies) and a relatively low frequency resolution at other frequency bands (e.g., high frequencies). A relatively high frequency resolution may be used for the low frequencies because the reverberation times at those low frequencies are longer, and thus a higher frequency resolution may be helpful for sampling at those frequencies. In the beamforming system 300, the MVDR beamforming filter module 376 determines an MVDR beamforming filter $w_{MVDR}(l,k,q)$ with uneven frequency resolution based on a signal $X_i^{\sim}(l,k,q)$ with uneven frequency resolution. In some implementations, a MVDR beamforming filter $w_{MVDR}(l,k,q)$ may be determined based further on a probability of speech with uneven frequency resolution. Such an MVDR beamforming filter $w_{MVDR}(l,k,q)$ may have further improved accuracy.

Figure 5:
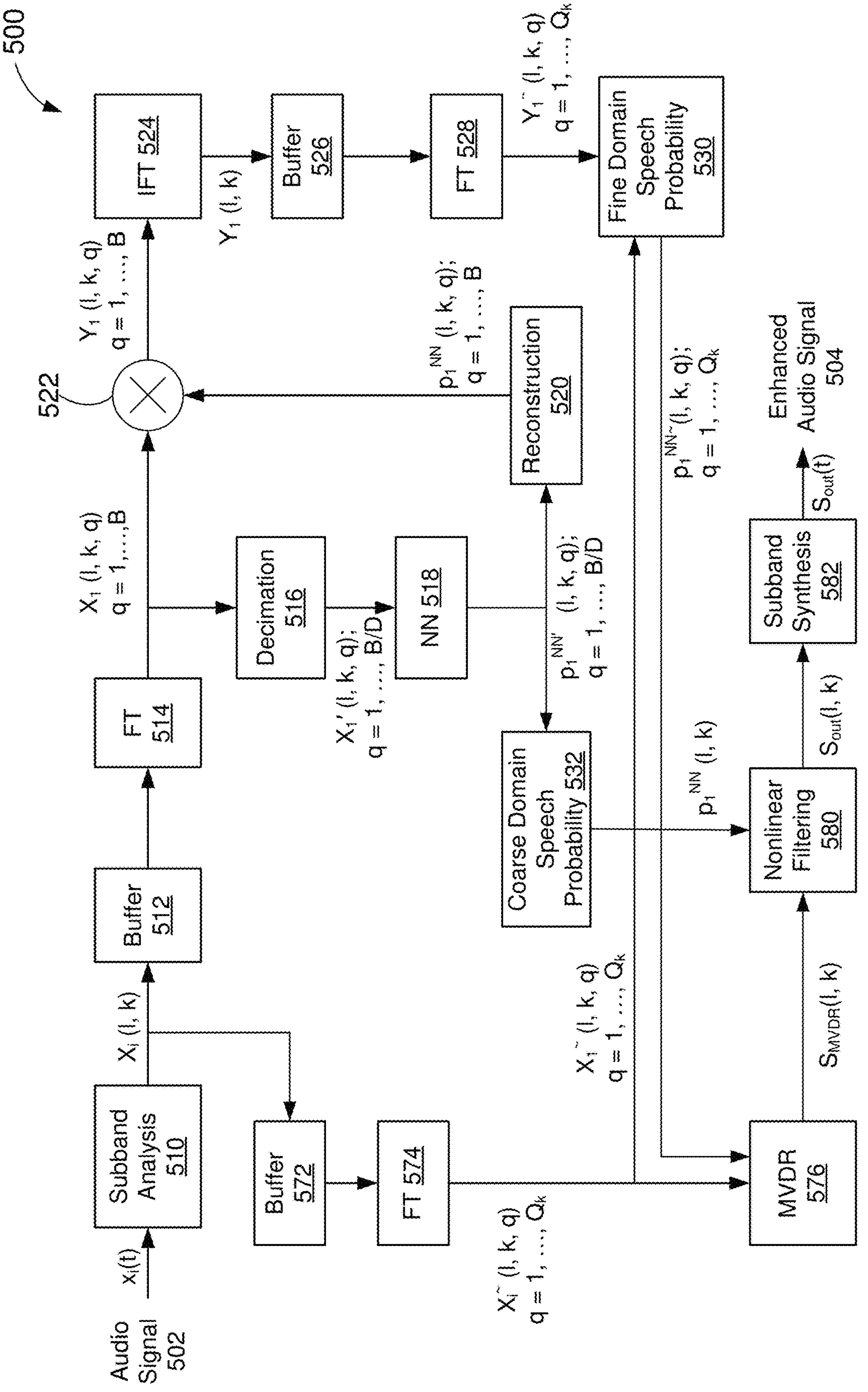
FIG. 5 shows a block diagram of another example beamforming system according to some implementations.

FIG. 5 shows a block diagram of another example beamforming system 500. Similar to the beamforming system 300, the beamforming system 500 is configured to generate one or more frames of an enhanced audio signal 504 based on one or more frames of an audio signal 502 received via a microphone array. The beamforming system 500 may implement an uneven frequency resolution for a probability of speech used as an input for determining an MVDR beamforming filter, as further described below. In some implementations, the microphone array may include any of the microphones 112-116 of FIG. 1 or any of the microphones 210(1)-210(M) of FIG. 2. With reference for example to FIG. 2, the audio signal 502 may be one example of a set of audio signals $x_i(t)$, in a time domain, received via the microphones 210(1)-210(M) (which includes the audio signals 202(1)-202(M), respectively). The MVDR beamforming filter implemented by the MVDR beamforming filter module 576 may be one example of the beamforming filter 220. Further, the output audio signal $S_{MVDR}(l,k)$ output by the MVDR beamforming filter module 576 may be one example of the output audio signal 206.

The beamforming system 500 includes a subband analysis module 510, a first buffer 512, a first Fourier transform (FT) 514, a decimation module 516, a NN 518, a reconstruction module 520, a mixer 522, an inverse Fourier transform (IFT) 524, a second buffer 526, a second FT 528, a fine domain speech probability module 530, a coarse domain speech probability module 532, a third buffer 572, a third FT 574, an MVDR beamforming filter module 576, a nonlinear filtering module 580, and a subband synthesis module 582. The subband analysis module 510 operates similarly to the subband analysis module 310 in the beamforming system 300, described above. The subband analysis module 510 is configured to transform a number (N) of time-domain samples, representing a frame of the input audio signal $x_i(t)$ 302, to N frequency-domain samples representing a respective audio frame $X_i(l,k)$ in the frequency domain, where I is a frame index, k is a frequency band or bin index, and i is a microphone index. In some implementations, the subband analysis module 510 may perform the transformation from the time domain to the frequency domain using a Fourier transform, such as a fast Fourier transform (FFT).

The first buffer 512 operates similarly to the first buffer 312 in the beamforming system 300, described above. The first buffer 512 configured to store (e.g., buffer) a number (B) of frames of the audio signal $X_i(l,k)$ for one microphone (e.g., i=1 for the first microphone) amongst the M microphones. In some implementations, the size B of the first buffer 512 is set according to Equation 25 above.

The first FT 514 operates similarly to the FT 314 in the beamforming system 300, described above. The first FT 514 is configured to map frames of the audio signal $X_1(l,k)$ (in the coarse domain) from the first buffer 512 to corresponding frames of an audio signal $X_1(l,k,q)$ in the fine domain, by transforming multiple frames of $X_1(l,k)$ to corresponding frames of $X_1(l,k,q)$. In some implementations, the first FT 514 is a Fourier transform (e.g., an FFT) of size B, and the number of sub-bins per frequency bin is equal to B (e.g., q=1, . . . , B).

The decimation module 516 operates similarly to the decimation module 316 in the beamforming system 300, described above. The decimation module 516 is configured to perform signal decimation on the signal $X_1(l,k,q)$ by reducing the number of sub-bins per frequency bin in the signal $X_1(l,k,q)$ by a factor D, where D is a whole number of two or greater, resulting in a decimated signal $X_1'(l,k,q)$. That is, the number of sub-bins per frequency bin, and correspondingly the number of frequency-domain samples in $X_1(l,k,q)$, is divided by D, so that the number of sub-bins per frequency bin in the decimated signal $X_1'(l,k,q)$ is B/D (e.g., q=1, . . . , B/D). An example of signal decimation is described above with reference to FIG. 4.

The decimation module 516 may provide the decimated signal $X_1'(l,k,q)$ as an input to the NN 518. The NN 518 operates similarly to the NN 318 in beamforming system 300, described above. The NN 318 may determine, based on the decimated signal $X_1'(l,k,q)$, a probability of speech $p_1^{NN'}(l,k,q)$, where k=1 . . . N/2 and q=1 . . . B/D. As described above, in some implementations, the probability of speech for the multiple microphones may be assumed to be the same. Accordingly, $p_i^{NN}(l,k,q)$ may be determined for one microphone (e.g., i=1 for the first microphone amongst the M microphones), and that $p_1^{NN}(l,k,q)$ may be used for the other values of i. The probability of speech $p_1^{NN'}(l,k,q)$ may be provided by the NN 518 as an input to the reconstruction module 520. The reconstruction module 520 may use the probability of speech $p_1^{NN'}(l,k,q)$ to reconstruct a probability of speech $p_1^{NN}(l,k,q)$ where k=1 . . . N/2 and q=1 . . . B. An example of speech probability reconstruction is described below with reference to FIG. 6.

The mixer 522 is configured to combine (e.g., multiply) the reconstructed probability of speech $p_1^{NN}(l,k,q)$ and the signal $X_1(l,k,q)$, where k=1 . . . N/2 and q=1 . . . B, to generate a speech signal $Y_1(l,k,q)$ in the fine domain, where k=1 . . . N/2 and q=1 . . . B. The IFT 524 transforms the speech signal $Y_1(l,k,q)$ to a speech signal $Y_1(l,k)$ in the coarse domain, where k=1 . . . N/2. For example, the IFT 524 may reverse the mapping performed by the FT 514. In some implementations, the IFT 524 is an inverse Fourier transform (e.g., an inverse FFT) of size B.

The second buffer 526 is configured to store (e.g., buffer) a number of frames of the speech signal $Y_1(l,k)$. For each frequency bin k, the second buffer 512 may store a respective number ($Q_k$) of frames of the speech signal $Y_1(l,k)$. As described above, $Q_k$ may be defined per frequency bin k based on a predetermined lookup table, a formula where $Q_k$ is a function of k, or various other predetermined rules. For example, $Q_k$ may be set to a particular value for values of k corresponding to frequencies below a predefined frequency threshold and may be set to a different value for other values of k. In some implementations, $Q_k$ may be larger for lower values of k (e.g., frequency bins corresponding to lower frequencies or frequencies below a threshold) and may be smaller for higher values of k (e.g., frequency bins corresponding to higher frequencies or frequencies above a threshold).

The second FT 528 is configured to map frames of the speech signal $Y_1(l,k)$ to corresponding frames of a speech signal $Y_1^{\sim}(l,k,q)$ with uneven frequency resolution. The second FT 526 may perform the mapping using a respective Fourier transform (e.g., an FFT) of size $Q_k$ for each frequency bin k, resulting in $Q_k$ sub-bins (e.g., q=1, . . . , $Q_k$) per frequency bin k. For example, if $Q_1$=8 for a frequency bin k=1, then the second FT 526 applies an FFT of size 8 to the signal $Y_1(l,1)$, resulting in a signal $Y_1^{\sim}(l,1,q)$, where q=1, 2, . . . , 8. If $Q_{33}$=4 for a frequency bin k=33, then the second FT 526 applies an FFT of size 4 to the signal $Y_1(l,33)$, resulting in a signal $Y_1^{\sim}(l,33,q)$, where q=1, 2, . . . , 4. In some implementations, $Q_k$ may be any whole number value between 1 and B, inclusive ($1 \le Q_k \le B$).

The third buffer 572 operates similarly to the second buffer 372 in the beamforming system 300, described above. The third buffer 572 is configured to store (e.g., buffer) a number of frames of the signal $X_i(l,k)$. For each microphone i, for each frequency bin k, the third buffer 572 may store a respective number ($Q_k$) of frames of the signal $X_i(l,k)$.

The third FT 574 operates similarly to the second FT 374 in the beamforming system 300, described above. The third FT 574 is configured to map, for each microphone i, frames of the audio signal $X_i(l,k)$ to corresponding frames of an audio signal $X_i^{\sim}(l,k,q)$ with uneven frequency resolution. The third FT 574 may perform the mapping using a respective Fourier transform (e.g., an FFT) of size $Q_k$ for each frequency bin k, resulting in $Q_k$ sub-bins (e.g., q=1, . . . $Q_k$) per frequency bin k. For example, if $Q_1$=8 for a frequency bin k=1, then the third FT module 574 applies an FFT of size 8 to the signal $X_i(l,1)$, resulting in a signal $X_i^{\sim}(l,1,q)$, where q=1, 2, . . . , 8. If $Q_{33}$=4 for a frequency bin k=33, then the third FT 574 applies an FFT of size 4 to the signal $X_i(l,33)$, resulting in a signal $X_i^{\sim}(l,33,q)$, where q=1, 2, . . . , 4.

The fine domain speech probability module 530 receives the signals $Y_1^{\sim}(l,k,q)$ and $X_1^{\sim}(l,k,q)$ from the second FT 528 and the third FT 574, respectively. The fine domain speech probability module 530 is configured to determine a speech probability $p_1^{NN\sim}(l,k,q)$, where k=1, . . . , N/2 and q=1, . . . , $Q_k$, as follows:

$$p_1^{NN\sim}(l,k,q) = \frac{Y_1^{\sim}(l,k,q)}{X_1^{\sim}(l,k,q)},\ k = 1, \ldots, N/2,\ q = 1, \ldots Q_k \tag{31}$$

The MVDR beamforming filter module 576 receives the speech probability $p_1^{NN\sim}(l,k,q)$ and $X_i^{\sim}(l,k,q)$ (both signals with uneven frequency resolution) from the fine domain speech probability module 530 and the third FT 574, respectively. In some implementations, the MVDR beamforming module 576 may determine an MVDR beamforming filter $\tilde{w}_{MVDR}(l,k,q)$ based on $p_1^{NN\sim}(l,k,q)$ and $X_i^{\sim}(l,k,q)$. The MVDR beamforming filter module 576 may further produce an output audio signal $S_{MVDR}(l,k)$ in the coarse domain based on $\tilde{w}_{MVDR}(l,k,q)$ and Equations 18-21 above. $\tilde{w}_{MVDR}(l,k,q)$ may be determined based on Equations 15-16 and 22-24 above.

The coarse domain speech probability module 532 operates similarly to the coarse domain speech probability module 332 in beamforming system 300, described above. The coarse domain speech probability module 532 receives the probability of speech $p_1^{NN'}(l,k,q)$ from the NN 518. In some implementations, the coarse domain speech probability module 532 may map the probability of speech $p_1^{NN'}(l,k,q)$ to a probability of speech $p_1^{NN}(l,k)$ in the coarse domain by computing an average (e.g., mean) of the probability values of the sub-bins per frequency bin as follows:

$$p_1^{NN}(l,k) = \frac{1}{B/D}\sum_{q=1}^{B/D} p_1^{NN'}(l,k,q) \tag{32}$$

The nonlinear filtering module 580 operates similarly to the nonlinear filtering module 380 in beamforming system 300, described above. The nonlinear filtering module 580 may estimate a power spectral density of noise $P_n(l,k)$ based on the output audio signal $S_{MVDR}(l,k)$ and the probability of speech $p^{NN}(l,k)$, as follows:

$$P_n(l,k) = p_1^{NN}(l,k)P_n(l,k) + \left(1 - p_1^{NN}(l,k)\right)|S_{SVDR}(l,k)|^2 \tag{33}$$

The nonlinear filtering 580 may use the power spectral density of noise $P_n(l,f)$ to further reduce noise in the output audio signal $S_{SVDR}(l,k)$. For example, the nonlinear filtering module 580 may subtract the power spectral density of noise $P_n(l,f)$ from the output audio signal $S_{SVDR}(l,k)$ using a spectral subtraction technique. An example suitable nonlinear filter may include, among other examples, a Gaussian mixture model (GMM) with spectral subtraction. The nonlinear filter module 580 outputs an enhanced audio signal in the time-frequency domain $S_{out}(l,k)$ as a result of the spectral subtraction.

The subband synthesis module 582 is configured to transform the enhanced audio signal $S_{out}(l,k)$ from the frequency domain to the time domain, as an enhanced audio signal $S_{out}(t)$. In some implementations, the subband synthesis module 582 may reverse the transformation performed by the subband analysis module 510. For example, the subband synthesis module 582 may perform the transformation from the frequency domain to the time domain using an N-point inverse Fourier transform, such as an inverse FFT.

Figure 6:
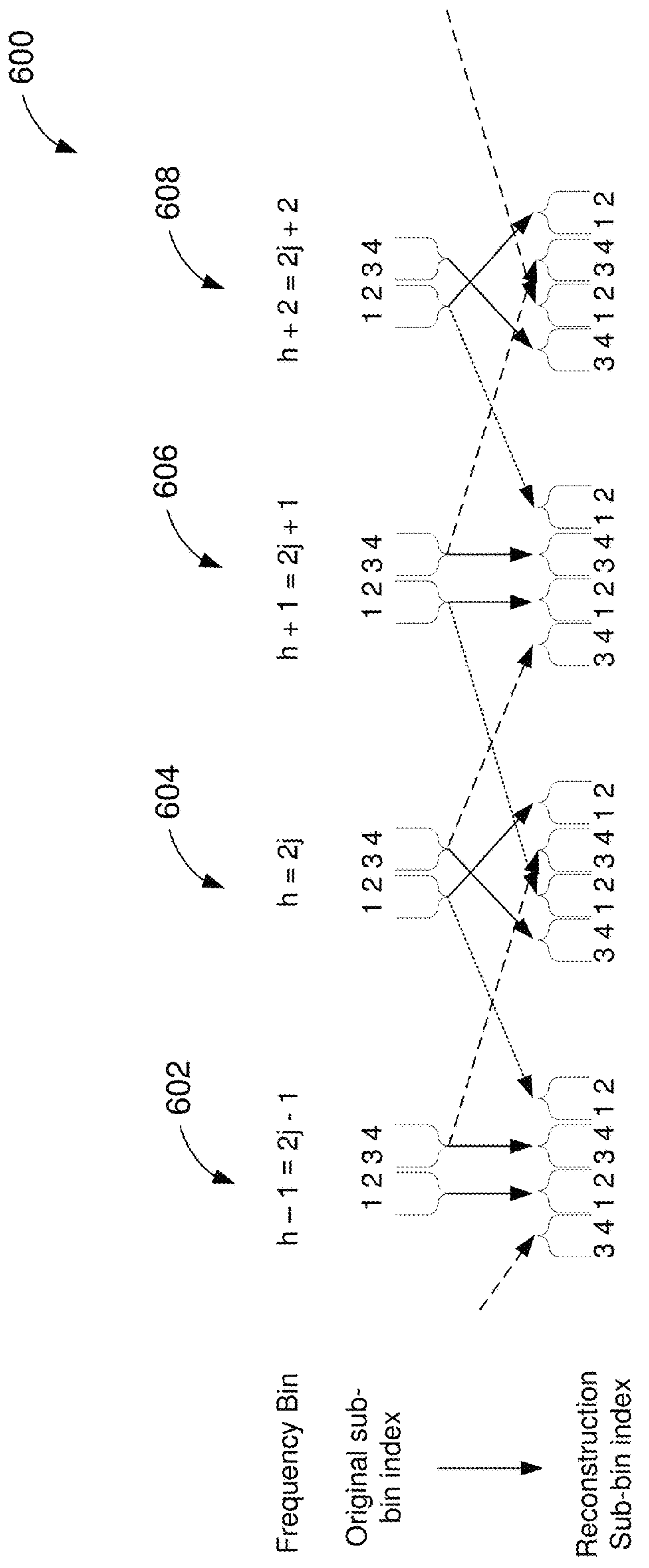
FIG. 6 shows an example operation for reconstructing a speech probability, according to some implementations.

FIG. 6 shows an example operation 600 speech probability reconstruction, according to some implementations. With reference for example to FIG. 5, the speech probability to be reconstructed may be one example of the probability of speech $p_1^{NN}(l,k,q)$. More specifically, the example operation 600 may be used to reconstruct a probability of speech $p_1^{NN}(l,k,q)$ from an original probability of speech $p_1^{NN'}(l,k,q)$.

In some implementations, sub-bins in a given frequency bin in the original probability of speech $p_1^{NN'}(l,k,q)$, and their associated probability values, are retained as-is in the given frequency bin in the reconstructed probability of speech $p_1^{NN}(l,k,q)$. Also for a given frequency bin, one or more sub-bins from a preceding frequency bin and one or more sub-bins from a succeeding frequency bin in the original probability of speech $p_1^{NN'}(l,k,q)$, and their associated probability values, are retained with weighting (e.g., the probability values associated with the sub-bins retained from the preceding or succeeding frequency bins are weighted) in the given frequency bin in the reconstructed probability of speech $p_1^{NN}(l,k,q)$. Further, in some implementations, for the even-numbered frequency bins, the sub-bins in the original probability of speech, and their associated probability values, are retained with re-arranging in the reconstructed probability of speech (e.g., sub-bins 1, 2, 3, 4 are re-arranged so that sub-bins 3, 4 come before sub-bins 1, 2); the re-arranging of the sub-bins in the even frequency bins for the reconstructed probability of speech reverses the re-arrangement of sub-bins in the even frequency bins in example decimation operation 400. In some implementations, the reconstruction performed by the reconstruction module 520 mirrors the decimation performed by the decimation module 516. For example, for a given frequency bin in the reconstructed probability of speech, the number of sub-bins retained from the preceding and succeeding frequency bins is the same as the number of sub-bins discarded from the given frequency bin in the decimation, and the number of sub-bins retained in the given frequency bin in the decimation is the same as the number of sub-bins that are retained as-is in the given frequency bin in the reconstructed probability of speech.

As shown, FIG. 6 illustrates frequency bins 602, 604, 606, and 608 with frequency bin index values h−1, h, h+1, and h+2, respectively. Frequency bins 602 and 606 are odd-numbered bins. As shown in FIG. 6, index value h−1 for frequency bin 602 is equal to an odd value 2j−1, and index value h+1 for frequency bin 606 is equal to an odd value 2j+1. On the other hand, frequency bins 604 and 608 are even-numbered bins. As shown in FIG. 6, index value h for frequency bin 604 is equal to an even value 2j, and index value h+2 for frequency bin 608 is equal to an even value 2j+2. Further as shown, FIG. 6 assumes values of B=8 and D=2. In the example operation 600, for each of the odd-numbered bins 602 and 606, sub-bins 1, 2, 3, 4 in the original bins are retained in the corresponding reconstructed bins 602 and 606, respectively, without re-arrangement. Also, in the example operation 600, for each of the even-numbered bins 604 and 608, sub-bins 1, 2, 3, 4 in the original bins are retained in the corresponding reconstructed bins 604 and 608 and re-arranged so that sub-bins 3, 4 come before sub-bins 1, 2. Also as shown, in each of the even-numbered bins 604 and 608, sub-bins 3, 4 from the preceding bin and sub-bins 1, 2 from the succeeding bin are retained with weighting in the reconstructed bin 604 and 608, respectively. For example, for even-numbered bin 604, sub-bins 1, 2, 3, 4 in the original bin are retained in the reconstructed bin 604 and re-arranged, as shown. Sub-bins 3, 4 from preceding original bin 602, and sub-bins 1, 2 from succeeding original bin 606, are retained in the reconstructed bin 604 and placed between the sub-bins 1, 2, 3, 4 retained from the original bin 604, as shown. As another example, for odd-numbered bin 606, sub-bins 1, 2, 3, 4 in the original bin are retained in the reconstructed bin 606, as shown. Sub-bins 3, 4 from preceding original bin 604, and sub-bins 1, 2 from succeeding original bin 608, are retained with weighting in the reconstructed bin 606 and placed around the sub-bins 1, 2, 3, 4 retained from the original bin 606, as shown.

In some other implementations, for each of the odd frequency bins, the sub-bins in the original are retained with re-arranging in the corresponding reconstructed bin (e.g., sub-bins 1, 2, 3, 4 are re-arranged so that sub-bins 3, 4 come before sub-bins 1, 2), as opposed to the re-arranging occurring in the even-numbered frequency bins as described above with reference to the operation 600.

As described above, a sub-bin from a preceding or a succeeding original bin may be retained with weighting in a reconstructed bin; the probability value associated with the sub-bin from the preceding or succeeding original bin is weighted in the reconstructed bin. In some implementations, the weight(s) may be determined using an empirical averaging of least squares approach. The empirical averaging of least squares approach may include first generating an independent and identically distributed Gaussian version of input audio signal $x_1(t)$. The Gaussian version of $x_1(t)$ is transformed to a Gaussian version of $X_1(l,k,q)$, where q=1 . . . B, which is then decimated to $X_1'(l,k,q)$ where q=1 . . . B/2, and then reconstructed back to $X_1(l,k,q)$ (e.g., according to the example operation 500) but without weighting sub-bins retained from preceding or succeeding frequency bins. A given weight may then be computed as an inverse problem as y=Ar. For example, say that a weight r for sub-bin 1 from a succeeding original even-numbered bin into a reconstructed odd-numbered bin is to be determined. Note that this weight r is used at a regular interval (e.g., every 16 indices in the reconstruction). In the inverse problem, y corresponds to the concatenation of the frequency bins in the Gaussian version of $X_1(l,k,q)$ over time that correspond to such indices, and A is the concatenation of the same indices but for the frequency bins in the above-described reconstruction without weighting. Thus, r becomes a scalar weight for that index. Note that y and A have the same R×1 dimension where R is the total number of repeated bins over time samples. The least squares solution to such inverse problem is $$r = (A^T A)^{-1} A^T y$$

where sub-bin 1 from a succeeding even-numbered bin is multiplied by weight r and then retained in a reconstructed odd-numbered bin.

Computation of the inverse problem y=Ar may be repeated for the other weights associated with the other sub-bins that are to be retained from preceding or succeeding original bins. In some implementations, the weights may be computed differently depending on whether the Fourier transforms in the beamforming system 500 (e.g., first FT 514) uses a rectangular window or a Hamming window.

Figure 7:
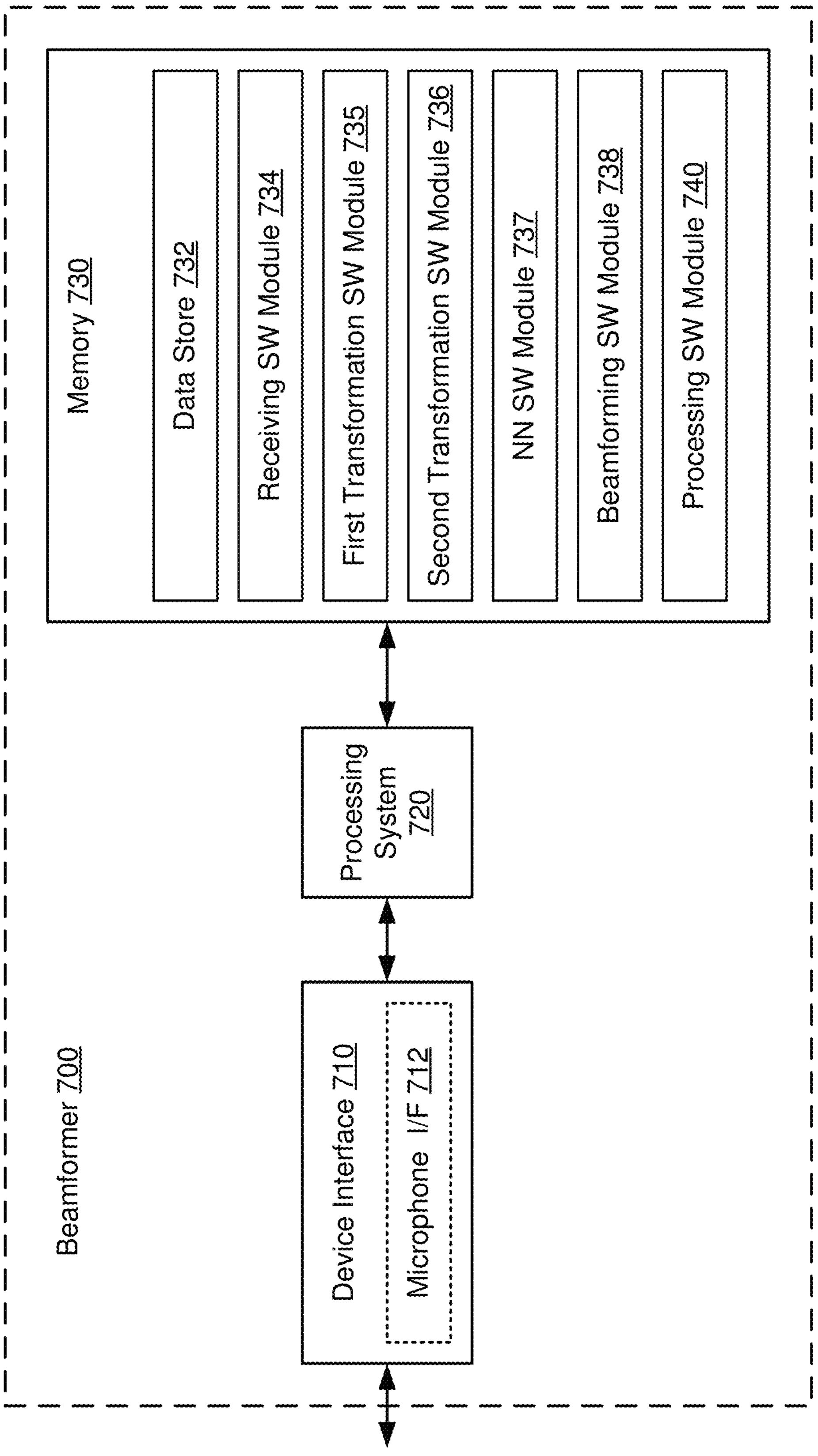
FIG. 7 shows a block diagram of yet another example beamforming system, according to some implementations.

FIG. 7 shows a block diagram of yet another example beamforming system 700, according to some implementations. More specifically, the beamforming system 700 may determine a beamforming filter based on an audio signal received via a microphone array. In some implementations, the beamforming system 700 may be one example of the beamforming system 300 of FIG. 3 or the beamforming system 500 of FIG. 5. The beamforming system 700 includes a device interface 710, a processing system 720, and a memory 730.

The device interface 710 is configured to communicate with one or more components of an audio receiver (such as the audio receiver 200 of FIG. 2). In some implementations, the device interface 710 may include a microphone interface (I/F) 712 configured to receive an audio signal via a plurality of microphones in a microphone array and to apply a beamforming filter (including a set of filter coefficients) to the outputs of each of the plurality of microphones. In some implementations, the received audio signal may be temporally subdivided into a plurality of frames each having a respective speech component and a respective noise component.

The memory 730 may include a data store 732 configured to store one or more frames of an audio signal received from the microphone array, as well as any intermediate signals or data that may be produced by the beamforming system 300 or 500 as a result of performing the beamforming techniques described above (such as any of the audio signals, probabilities of speech, or enhanced signals described with reference to FIGS. 3-6). The memory 730 also may include a non-transitory computer-readable medium (including one or more nonvolatile memory elements, such as EPROM, EEPROM, Flash memory, or a hard drive, among other examples) that may store at least the following software (SW) modules:

- a receiving SW module 734 to receive a first audio signal via a plurality of microphones, the first audio signal including a number (B) of frames for each of the plurality of microphones, each of the B frames for each of the plurality of microphones including a number (N) of time-domain samples;
- a first transformation SW module 735 to transform, for a first microphone included in the plurality of microphones, the B*N time-domain samples into B*N/2 first frequency-domain samples based on an N-point fast Fourier transform (FFT);
- a second transformation SW module 736 to transform, for the first microphone, the B*N/2 first frequency-domain samples into B*N/2 second frequency-domain samples based on a B-point FFT;
- a neural network (NN) SW module 737 to determine, for the first microphone, a probability of speech associated with the B*N/2 second frequency-domain samples based on a neural network model;
- a beamforming SW module 738 to determine a minimum variance distortionless response (MVDR) beamforming filter based at least in part on the probability of speech for the first microphone; and
- a processing SW module 740 to process the first audio signal based on the MVDR beamforming filter.

Each software module includes instructions that, when executed by the processing system 720, causes the beamforming system 700 to perform the corresponding functions.

The processing system 720 may include any suitable one or more processors capable of executing scripts or instructions of one or more software programs stored in the beamforming system 700 (such as in the memory 730). For example, the processing system 720 may execute the first transformation SW module 735 to transform a set of time-domain samples associated with the one or more received frames into a set of first frequency-domain samples, and may execute the second transformation SW module 736 to transform a set of first frequency-domain samples associated with the one or more received frames into a set of second frequency domain samples. Also, the processing system 720 may execute the NN SW module 737 to determine a probability of speech based on a neural network model (e.g., determining a probability of speech associated with the one or more received frames). Further, the processing system 720 also may execute the beamforming SW module 738 to determine an MVDR beamforming filter that minimizes a power of the noise component of the first frame, without distorting the speech component of the one or more received frames, based at least in part on the probability of speech associated with the one or more received frames. The processing system 720 may further execute the processing SW module 740 to process the one or more received frames based on the MVDR beamforming filter.

Figure 8:
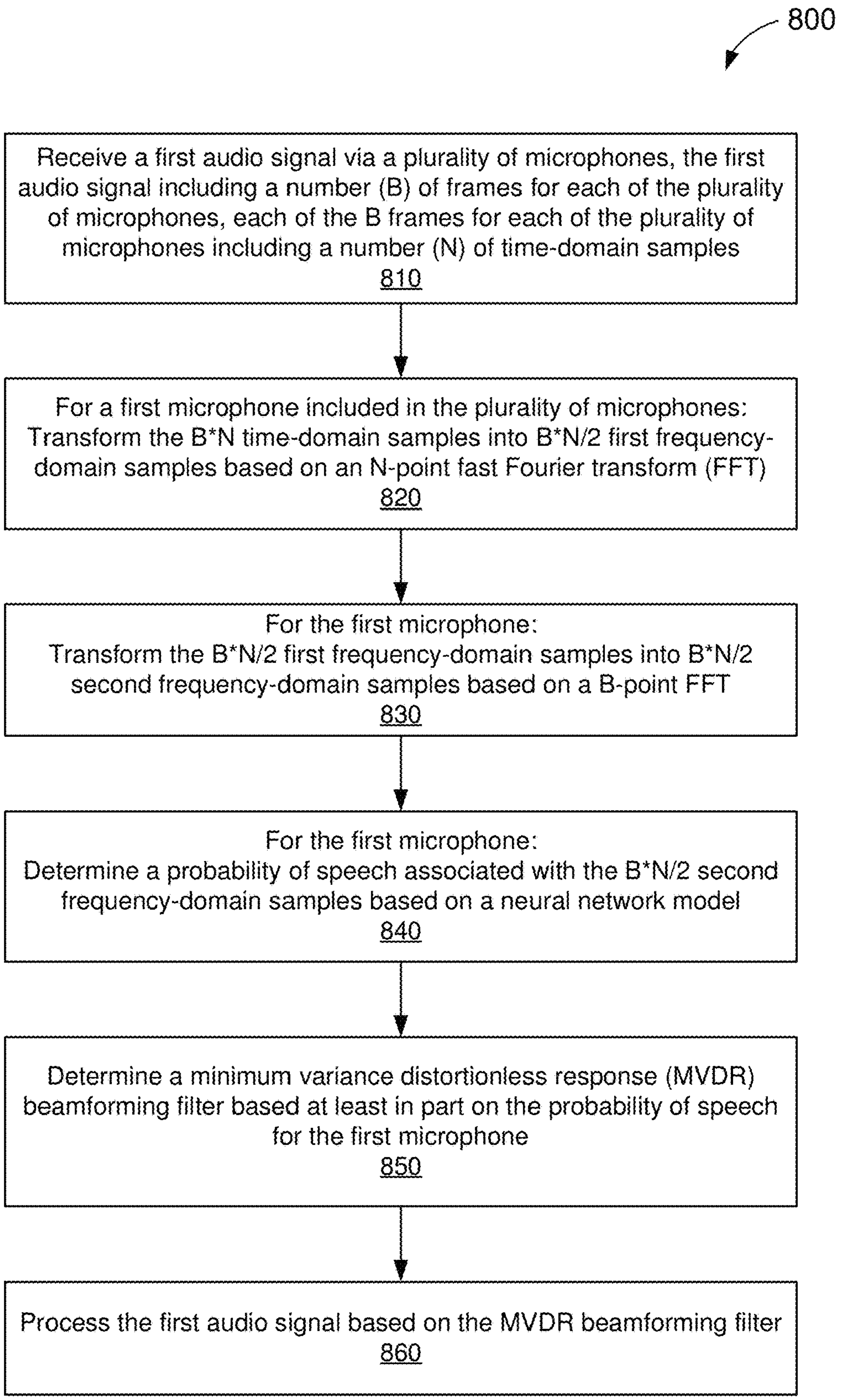
FIG. 8 shows an illustrative flowchart depicting an example operation for processing audio signals, according to some implementations.

FIG. 8 shows an illustrative flowchart depicting an example operation 800 for processing audio signals, according to some implementations. In some implementations, the example operation 800 may be performed by a beamformer such as any of the beamforming system 300 or 500 of FIGS. 3 and 5, respectively.

The beamforming system may receive first audio signal via a plurality of microphones, the first audio signal including a number (B) of frames for each of the plurality of microphones, each of the B frames for each of the plurality of microphones including a number (N) of time-domain samples (810). The beamforming system may, for a first microphone included in the plurality of microphones, transform the B*N time-domain samples into B*N/2 first frequency-domain samples based on an N-point fast Fourier transform (FFT) (820), transform the B*N/2 first frequency-domain samples into B*N/2 second frequency-domain samples based on a B-point FFT (830), and determine a probability of speech associated with the B*N/2 second frequency-domain samples based on a neural network model (840). The beamforming system may determine a minimum variance distortionless response (MVDR) beamforming filter based at least in part on the probability of speech for the first microphone (850). The beamforming system may process the first audio signal based on the MVDR beamforming filter (860).

In some aspects, the beamforming system may generate a first speech signal based on the probability of speech for the first microphone and the B*N/2 second frequency-domain samples; transform the first speech signal into a second speech signal based on a B-point inverse FFT; transform the second speech signal into a third speech signal, wherein the third speech signal includes a first number of frequency-domain samples associated with a first frequency bin and a second number of frequency-domain samples associated with a second frequency bin, wherein the first and second numbers are different; and determine a probability of speech associated with the third speech signal.

In some aspects, the beamforming system may determine the MVDR beamforming filter based on the probability of speech associated with the third speech signal.

In some aspects, the beamforming system may generate a second audio signal based on the B*N/2 first frequency-domain samples, wherein the second audio signal includes the first number of frequency-domain samples associated with the first frequency bin and the second number of frequency-domain samples associated with the second frequency bin.

In some aspects, the beamforming system may generate a reconstructed probability of speech based on the probability of speech associated with the B*N/2 second frequency-domain samples.

In some aspects, the reconstructed probability of speech includes, for a first frequency bin in the probability of speech associated with the B*N/2 second frequency-domain samples: a first plurality of probability values included in the probability of speech associated with the B*N/2 second frequency-domain samples and corresponding to a first plurality of second frequency-domains samples associated with the first frequency bin; a second plurality of probability values included in the probability of speech associated with the B*N/2 second frequency-domain samples and corresponding to a second plurality of second frequency-domains samples associated with a third frequency bin preceding the first frequency bin; and a third plurality of probability values included in the probability of speech associated with the B*N/2 second frequency-domain samples and corresponding to a third plurality of second frequency-domains samples associated with a fourth frequency bin succeeding the first frequency bin.

In some aspects, each of the second plurality of probability values is weighted by a respective first weight, and each of the third plurality of probability values is weighted by a respective second weight.

In some aspects, the beamforming system may buffer the B frames; and apply the N-point FFT to the buffered frames.

In some aspects, the beamforming system may decimate the B*N/2 second frequency-domain samples by a decimation factor (D), the probability of speech associated with the B*N/2 second frequency-domain samples being determined based on the B*N/2D decimated second frequency-domain samples.

In some aspects, D=2.

In some aspects, the beamforming system may retain B/2D second frequency-domain samples associated with a first frequency bin; and discard B/2D second frequency-domain samples associated with the first frequency bin.

In some aspects, the beamforming system may determine an average probability of speech for each frequency bin associated with the B*N/2 second frequency-domain samples; and determine a probability of speech associated with the B*N/2 first frequency-domain samples based on the average probabilities of speech.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of processing an audio signal, comprising:

receiving a first audio signal via a plurality of microphones, the first audio signal including a number (B) of frames for each of the plurality of microphones, each of the B frames for each of the plurality of microphones including a number (N) of time-domain samples;

for a first microphone included in the plurality of microphones:

transforming the B*N time-domain samples into B*N/2 first frequency-domain samples based on an N-point fast Fourier transform (FFT);

transforming the B*N/2 first frequency-domain samples into B*N/2 second frequency-domain samples based on a B-point FFT; and determining a probability of speech associated with the B*N/2 second frequency-domain samples based on a neural network model;

determining a minimum variance distortionless response (MVDR) beamforming filter based at least in part on the probability of speech for the first microphone; and processing the first audio signal based on the MVDR beamforming filter.

2. The method of claim 1, further comprising:

generating a first speech signal based on the probability of speech for the first microphone and the B*N/2 second frequency-domain samples;

transforming the first speech signal into a second speech signal based on a B-point inverse FFT;

transforming the second speech signal into a third speech signal, wherein the third speech signal includes a first number of frequency-domain samples associated with a first frequency bin and a second number of frequency-domain samples associated with a second frequency bin, wherein the first and second numbers are different; and, determining a probability of speech associated with the third speech signal.

3. The method of claim 2, wherein the determining of the MVDR beamforming filter comprises determining the MVDR beamforming filter based on the probability of speech associated with the third speech signal.

4. The method of claim 3, further comprising generating a second audio signal based on the B*N/2 first frequency-domain samples, wherein the second audio signal includes the first number of frequency-domain samples associated with the first frequency bin and the second number of frequency-domain samples associated with the second frequency bin.

5. The method of claim 4, further comprising generating a reconstructed probability of speech based on the probability of speech associated with the B*N/2 second frequency-domain samples.

6. The method of claim 5, wherein the reconstructed probability of speech comprises:

for the first frequency bin in the probability of speech associated with the B*N/2 second frequency-domain samples:

a first plurality of probability values included in the probability of speech associated with the B*N/2 second frequency-domain samples and corresponding to a first plurality of second frequency-domain samples associated with the first frequency bin;

a second plurality of probability values included in the probability of speech associated with the B*N/2 second frequency-domain samples and corresponding to a second plurality of second frequency-domain samples associated with a third frequency bin preceding the first frequency bin; and a third plurality of probability values included in the probability of speech associated with the B*N/2 second frequency-domain samples and corresponding to a third plurality of second frequency-domain samples associated with a fourth frequency bin succeeding the first frequency bin.

7. The method of claim 6, wherein each of the second plurality of probability values is weighted by a respective first weight, and each of the third plurality of probability values is weighted by a respective second weight.

8. The method of claim 1, wherein the transforming of the B*N time-domain samples into the B*N/2 first frequency-domain samples comprises:

buffering the B frames; and applying the N-point FFT to the buffered frames.

9. The method of claim 1, wherein the determining of the probability of speech associated with the B*N/2 second frequency-domain samples comprises decimating the B*N/2 second frequency-domain samples by a decimation factor (D), the probability of speech associated with the B*N/2 second frequency-domain samples being determined based on the B*N/2D decimated second frequency-domain samples.

10. The method of claim 9, wherein D=2.

11. The method of claim 9, wherein the decimating of the B*N/2 second frequency-domain samples comprises:

retaining B/2D second frequency-domain samples associated with a first frequency bin; and discarding B/2D second frequency-domain samples associated with the first frequency bin.

12. The method of claim 1, further comprising:

determining an average probability of speech for each frequency bin associated with the B*N/2 second frequency-domain samples; and determining a probability of speech associated with the B*N/2 first frequency-domain samples based on the average probabilities of speech.

13. A beamforming system, comprising:

a processing system; and a memory storing instructions that, when executed by the processing system, causes the speech enhancement system to:

receive a first audio signal via a plurality of microphones, the first audio signal including a number (B) of frames for each of the plurality of microphones, each of the B frames for each of the plurality of microphones including a number (N) of time-domain samples;

for a first microphone included in the plurality of microphones:

transform the B*N time-domain samples into B*N/2 first frequency-domain samples based on an N-point fast Fourier transform (FFT);

transform the B*N/2 first frequency-domain samples into B*N/2 second frequency-domain samples based on a B-point FFT; and determine a probability of speech associated with the B*N/2 second frequency-domain samples based on a neural network model;

determine a minimum variance distortionless response (MVDR) beamforming filter based at least in part on the probability of speech for the first microphone; and process the first audio signal based on the MVDR beamforming filter.

14. The beamforming system of claim 13, wherein execution of the instructions further causes the beamforming system to:

generate a first speech signal based on the probability of speech for the first microphone and the B*N/2 second frequency-domain samples;

transform the first speech signal into a second speech signal based on a B-point inverse FFT;

transform the second speech signal into a third speech signal, wherein the third speech signal includes a first number of frequency-domain samples associated with a first frequency bin and a second number of frequency-domain samples associated with a second frequency bin, wherein the first and second numbers are different; and, determine a probability of speech associated with the third speech signal.

15. The beamforming system of claim 14, wherein execution of the instructions further causes the beamforming system to determine the MVDR beamforming filter based on the probability of speech associated with the third speech signal.

16. The beamforming system of claim 15, wherein execution of the instructions further causes the beamforming system to generate a second audio signal based on the B*N/2 first frequency-domain samples, wherein the second audio signal includes the first number of frequency-domain samples associated with the first frequency bin and the second number of frequency-domain samples associated with the second frequency bin.

17. The beamforming system of claim 16, wherein execution of the instructions further causes the beamforming system to generate a reconstructed probability of speech based on the probability of speech associated with the B*N/2 second frequency-domain samples.

18. The beamforming system of claim 17, wherein the reconstructed probability of speech comprises:

for the first frequency bin in the probability of speech associated with the B*N/2 second frequency-domain samples:

a first plurality of probability values included in the probability of speech associated with the B*N/2 second frequency-domain samples and corresponding to a first plurality of second frequency-domain samples associated with the first frequency bin;

a second plurality of probability values included in the probability of speech associated with the B*N/2 second frequency-domain samples and corresponding to a second plurality of second frequency-domain samples associated with a third frequency bin preceding the first frequency bin; and a third plurality of probability values included in the probability of speech associated with the B*N/2 second frequency-domain samples and corresponding to a third plurality of second frequency-domain samples associated with a fourth frequency bin succeeding the first frequency bin.

19. The beamforming system of claim 13, wherein execution of the instructions further causes the beamforming system to:

buffer the B frames; and apply the N-point FFT to the buffered frames.

20. The beamforming system of claim 13, wherein execution of the instructions further causes the beamforming system to decimate the B*N/2 second frequency-domain samples by a decimation factor (D), the probability of speech associated with the B*N/2 second frequency-domain samples being determined based on the B*N/2D decimated second frequency-domain samples.

* * * * *